US012117981B2

(12) United States Patent
Jamieson et al.

(10) Patent No.: US 12,117,981 B2
(45) Date of Patent: Oct. 15, 2024

(54) AUTOMATIC DISCOVERY OF EXECUTED PROCESSES

(71) Applicant: SAP SE, Walldorf (DE)

(72) Inventors: Natallia Jamieson, West Midlands (GB); Gregor Berg, Berlin (DE); Andre Niklas Wenz, Berlin (DE); Sean Leonard, County Louth (IE); Chirag Poddar, Dublin (IE)

(73) Assignee: SAP SE, Walldorf (DE)

( * ) Notice: Subject to any disclaimer, the term of this patent is extended or adjusted under 35 U.S.C. 154(b) by 546 days.

(21) Appl. No.: 17/122,852

(22) Filed: Dec. 15, 2020

(65) Prior Publication Data

US 2022/0188283 A1 Jun. 16, 2022

(51) Int. Cl.
*G06F 16/21* (2019.01)
*G06F 11/36* (2006.01)
*G06F 16/17* (2019.01)

(52) U.S. Cl.
CPC ........ *G06F 16/219* (2019.01); *G06F 16/1734* (2019.01)

(58) Field of Classification Search
CPC ........................... G06F 16/219; G06F 16/1734
See application file for complete search history.

(56) References Cited

U.S. PATENT DOCUMENTS

2011/0113287 A1* 5/2011 Gururaj ............... G06F 11/0706 714/E11.029
2016/0378734 A1* 12/2016 Mullins ............... G06F 3/04855 715/229
2017/0004185 A1* 1/2017 Zhu ........................ G06N 20/00
2018/0276109 A1* 9/2018 Archer ................ G06F 11/3688
2019/0179731 A1* 6/2019 V ........................ G06F 11/3684
2020/0287992 A1 9/2020 Berg et al.
2021/0073026 A1* 3/2021 Myers ................. G06F 11/3065
2021/0279577 A1* 9/2021 West ...................... G06N 3/045
2022/0066891 A1* 3/2022 Pochuev ............. G06F 11/2028

OTHER PUBLICATIONS

"European Application Serial No. 21209226.6, Extended European Search Report mailed May 12, 2022", 11 pgs.
Taymouri, Farbod, et al., "Business Process Variant Analysis: Survey and Classification", arXiv: 1911.07582V1, (2019), 29 pgs.

* cited by examiner

*Primary Examiner* — Sherief Badawi
*Assistant Examiner* — Earl Elias
(74) *Attorney, Agent, or Firm* — SCHWEGMAN LUNDBERG & WOESSNER

(57) ABSTRACT

Data is gathered from a log file on a first application server, a log file on a second application server, a database on a database server, or any suitable combination thereof. By correlating the data from different sources, XP-Functions that execute in sequence on a single application server are identified and combined into a sequence referred to as an executable process chain (XP-Chain). The automatic process discovery server reconstructs end-to-end processes out of XP-Chains, even when the XP-Chains are executed on different application servers, based on log files and database data. A test script may be generated for an identified end-to-end process. By running the test script, proper functioning of the end-to-end process may be confirmed. Existing test scripts may be disabled for a formerly identified end-to-end process that is no longer found to be executed.

20 Claims, 20 Drawing Sheets

PROCESS DISCOVERY TABLE — 300

| | OBJECT ID | SYSTEM ID | CLIENT ID | OBJECT CATEGORY ID | PROCESS TYPE ID | ITEM TYPE | USER TYPE | ORG TYPE | KEY EXECUTABLE OBJECT | XP-CELL INDEX |
|---|---|---|---|---|---|---|---|---|---|---|
| 330A | 1 | 100 | 101 | C | CMB0 | 1001 | A | 1710 | VA01 | A_C_101_CBM0_1001 |
| 330B | 1 | 100 | 101 | C | CBM0 | 1000 | B | 1710 | XVA01 | B_C_101_CBM0_1000 |
| 330C | 1 | 100 | 101 | H | CBM0 | 1003 | A | 1720 | F1814 | A_H_101_CBM0_1003 |
| 330D | 1 | 100 | 101 | G | ZZOR | 1002 | B | 1710 | ZVA01 | B_G_101_ZZOR_1002 |
| 330E | 2 | 200 | 201 | D | ZXOR | 4001 | B | 2700 | ZMM01 | B_D_201_ZXOR_4001 |
| 330F | 3 | 100 | 101 | F | CM1 | 1005 | A | 1710 | ZXD01 | A_F_101_CM1_1005 |

*FIG. 3*

PROCESS TYPE TABLE (410)

| OBJECT CATEGORY | PROCESS TYPE | PROCESS TYPE ID |
|---|---|---|
| ORDER [C] | MTO STANDARD ORDER | CBM0 |
| CONTRACT [G] | SERVICE CONTRACT | CBM0 |
| PURCH. REQ. [E] | WITHOUT PLANNING | CBM0 |
| PURCH. ORDER [D] | SUBCONTRACTING PO | ZZOR |
| CUSTOMER MASTER [F] | AGENT CUSTOMER | ZXOR |
| CUSTOMER INFO [A] | AGENT INFO RECORD | CM1 |

USER TYPE TABLE (440)

| USER TYPE | USER TYPE NAME |
|---|---|
| A | DIALOG |
| B | SYSTEM |

BUSINESS OBJECT TABLE (470)

| OBJECT ID | BUSINESS OBJECT |
|---|---|
| 1 | SALES |
| 2 | PURCHASING |
| 3 | CUSTOMER |

| | XP-FUNCTION TABLE | | |
|---|---|---|---|
| 520 | XP-CELL INDEX | XP-FUNCTION | FUNCTION ID |
| 530A | A_C_101_CBM0_1001 | DIALOG CREATE ORDER, MTO STANDARD ORDER, FREE ITEMS | FUNC001 |
| 530B | B_C_101_CBM0_1000 | BATCH CREATE MTO STANDARD ORDER, STANDARD ITEM | FUNC002 |
| 530C | A_H_101_CBM0_1003 | DIALOG CHANGE RETURN, MTO STANDARD ORDER, SAMPLE ITEM | FUNC003 |
| 530D | B_G_101_ZZOR_1002 | BATCH CREATE CONTACT, SERVICE CONTACT, CONSULTING | FUNC004 |
| 530E | B_D_201_ZXOR_4001 | BATCH CREATE PURCHASE ORDER, SUBCONTRACTING PO, STANDARD ITEM | FUNC005 |
| 530F | A_F_101_CM1_1003 | DIALOG CREATE CUSTOMER MASTER, AGENT CUSTOMER | FUNC006 |

| XP-CHAIN TABLE | | | | |
|---|---|---|---|---|
| 620 | SERVER ID | CHAIN ID | FUNCTION ID | SEQ |
| 630A | A | CHAIN001 | FUNC001 | 1 |
| 630B | A | CHAIN001 | FUNC002 | 2 |

640

| PROCESS SET TABLE | | | |
|---|---|---|---|
| 650 | PROCESS SET ID | PROCESS SET | CHAIN ID |
| 660A | 0001 | ORDER | CHAIN001 |
| 660B | 0001 | ORDER | CHAIN007 |
| 660C | 0002 | INVOICE | CHAIN002 |
| 660D | 0002 | INVOICE | CHAIN003 |
| 660E | 0003 | INVOICE CANCELLATION | CHAIN004 |
| 660F | 0003 | INVOICE CANCELLATION | CHAIN005 |

| OBJECT CATEGORY TABLE | | |
|---|---|---|
| 720 | BUSINESS OBJECT | OBJECT CATEGORY |
| 730A | SALES | ORDER |
| 730B | SALES | CONTRACT |
| 730D | SALES | RETURN |
| 730E | PURCHASING | PURCHASE REQUISITION |
| 730F | PURCHASING | PURCHASE ORDER |
| 730G | CUSTOMER | CUSTOMER MASTER |
| 730H | CUSTOMER | CUSTOMER INFORECORDS |

740

| EXECUTABLE OBJECT TABLE | | |
|---|---|---|
| 750 | EXECUTABLE OBJECT | EXECUTABLE OBJECT NAME |
| 760A | VA01 | CREATE SALES ORDER |
| 760B | XVA01 | CREATE SALES ORDER |
| 760C | F1814 | CREATE SALES ORDER |
| 760D | ZVA01 | CREATE SALES ORDER |

*FIG. 7*

| EXECUTED OBJECTS TABLE /810 | | |
|---|---|---|
| TIMESTAMP | TASK TYPE | EXECUTABLE OBJECT |
| T1 | DIALOG [D] | VA01 |
| T2 | BATCH [B] | XVA01 |
| T3 | DIALOG [D] | VA01 |
| T4 | DIALOG [D] | XVA01 |
| T5 | DIALOG [D] | F1814 |
| T6 | BATCH [B] | ZVA01 |
| T7 | BATCH [B] | ZMM01 |
| T8 | DIALOG [D] | ZXD01 |

| SINGLE ROLE OF PROCESS TYPE TABLE /840 | | | |
|---|---|---|---|
| ROLE ID | ROLE | PROCESS TYPE | USER ID |
| 11 | SALES CLERK | CBM0 | ID1001 |
| 12 | SUPERVISOR | ZZOR | ID1002 |
| 11 | SALES CLERK | ZXOR | ID1003 |
| 13 | FIN. MANAGER | CM1 | ID1004 |

*FIG. 8*

910 SINGLE ROLE OF EXECUTABLE OBJECT TABLE

| ROLE ID | ROLE | EXECUTABLE OBJECT TYPE | USER ID |
|---|---|---|---|
| 14 | SALES CLERK_SD | VA01 | ID1001 |
| 15 | SUPERVISOR_SD | XVA01 | ID1002 |
| 16 | SALES CLERK_SD | F1814 | ID1003 |
| 17 | FIN. MANAGER_SD | ZVA01 | ID1004 |

940 COMPOSITE ROLE TABLE

| COMPOSITE ROLE ID | ROLE | PROCESS ROLE ID | EXECUTABLE ROLE ID | USER ID |
|---|---|---|---|---|
| 1 | SO_SALES CLERK | 11 | 14 | ID1001 |
| 2 | SO_SUPERVISOR | 12 | 15 | ID1002 |
| 3 | SO_SALES CLERK | 11 | 16 | ID1003 |
| 4 | CUS_FI MANAGER | 13 | 17 | ID1004 |

*FIG. 9*

CREATE SALES DOCUMENT — 1105

| ORDER TYPE: | CBM0 | MTO STANDARD ORDER |
|---|---|---|

1110, 1115, 1120

ORGANIZATIONAL DATA — 1125

| SALES ORGANIZATION | 11110 | DOM. SALES ORG US |
|---|---|---|
| DISTRIBUTION CHANNEL | 10 | DIRECT SALES |
| DIVISION | 00 | PRODUCT DIVISION 00 |
| SALES OFFICE | | |
| SALES GROUP | | |

CREATE WITH REFERENCE — 1195

*1200*

CREATE MTO STANDARD ORDER ~1205

| QUOTATION: | 20000004 |
|---|---|

| MTO STANDARD ORDER | CBM0 |
|---|---|

| NET VALUE: | 353.50 | USD |
|---|---|---|

| SOLD-TO PARTY: | 11210005 | DOM. US CUSTOMER 5 (CMS) / 1000 2ND AVE N / BILLINGS MT 59101-2614 |
|---|---|---|

| SHIP-TO PARTY: | 11210005 | DOM. US CUSTOMER 5 (CMS) / 1000 2ND AVE N / BILLINGS MT 59101-2614 |
|---|---|---|

| CUST. REFERENCE: | CR11209011 |
|---|---|

| REQ. DELIV. DATE | 12/21/20112 |
|---|---|

1400

PROCESS DISCOVERY REPOSITORY 1410

| | FUNC. AREA (1420) | FUNC. PROCESS (1425) | PROCESS SET (1430) | XP-CHAIN (1440) | XP-FUNCTION (1450) | SEQ (1460) | KEY EXECUTABLE OBJECT (1470) | XP-CELL (1480) |
|---|---|---|---|---|---|---|---|---|
| 1490A | DELIVER | SALES | ORDER | MTO STANDARD ORDER | DIALOG CREATE ORDER, MTO STANDARD ORDER, FREE ITEMS | 1 | VA01 | A_C_101_CBM0_I_1001 |
| 1490B | DELIVER | SALES | ORDER | MTO STANDARD ORDER | BATCH CREATE MTO STANDARD ORDER, STANDARD ITEM | 1 | XVA01 | B_C_101_CBM0_I_1000 |
| 1490C | DELIVER | SALES | ORDER | MTO STANDARD ORDER | DIALOG CHANGE ORDER, MTO STANDARD ORDER, FREE ITEM | 2 | VA02 | A_C_101_CBM0_U_1001 |
| 1490D | DELIVER | SALES | ORDER | MTO STANDARD ORDER | DIALOG CHANGE ORDER, MTO STANDARD ORDER, STANDARD ITEM | 3 | VA02 | A_C_101_CBM0_U_1000 |

PROCESS DISCOVERY REPOSITORY 1510

1515

| E2E PROCESS | E2E SCENARIO | FUNCTIONAL AREA |
|---|---|---|
| ORDER-TO-CASH | O2C: ORDER FOR MTO STANDARD ORDER, STANDARD ITEM, BILLING EXPECTED, PRICING EXPECTED | DELIVER |

| | FUNC. PROCESS (1520) | PROCESS SET (1525) | XP-CHAIN (1530) | XP-CHAIN ID (1540) | XP-FUNCTION (1550) | SEQ (1560) | KEY EXECUTABLE OBJECT (1570) | XP-CELL (1580) |
|---|---|---|---|---|---|---|---|---|
| 1590A | SALES | ORDER | MTO STANDARD ORDER | CHAIN0 01 | BATCH CREATE ORDER, MTO STANDARD ORDER, STANDARD ITEM | 1 | XVA01 | B_C_101_CBM0_I_1000 |
| 1590B | SALES | ORDER | MTO STANDARD ORDER | CHAIN0 01 | DIALOG CHANGE ORDER, MTO STANDARD ORDER, STANDARD ITEM | 2 | VA02 | A_C_101_CBM0_U_1000 |
| 1590C | BILLING | INVOICE | STANDARD INVOICE | CHAIN0 02 | DIALOG CREATE INVOICE, STANDARD INVOICE, STANDARD ITEM | 3 | VF01 | A_M_101_ZMOR_I_1000 |

*FIG. 15*

AUTOMATIC DISCOVERY OF EXECUTED PROCESSES

TECHNICAL FIELD

The subject matter disclosed herein generally relates to discovery of executed processes. Specifically, the present disclosure addresses systems and methods to automatically identify executed processes, the tasks that comprise them, and their active executed system objects.

BACKGROUND

Using current techniques, experts manually describe, map, and sequence process objects and end-to-end processes. Analysis tools analyze database logs to determine partial sequences of operations on objects, but are unable to fully define end-to-end processes that include system steps and their tasks that are not reflected in the database logs.

BRIEF DESCRIPTION OF THE DRAWINGS

Some embodiments are illustrated by way of example and not limitation in the figures of the accompanying drawings.

FIGS. 3-9 are block diagrams of a database schema, according to some example embodiments, suitable for use by a process discovery server in automatically discovering executed processes.

FIG. 14 is a diagram of a UI for displaying functions in executed processes, according to some example embodiments.

FIG. 15 is a diagram of a UI for displaying functions in executed processes, according to some example embodiments.

DETAILED DESCRIPTION

Figure 1:
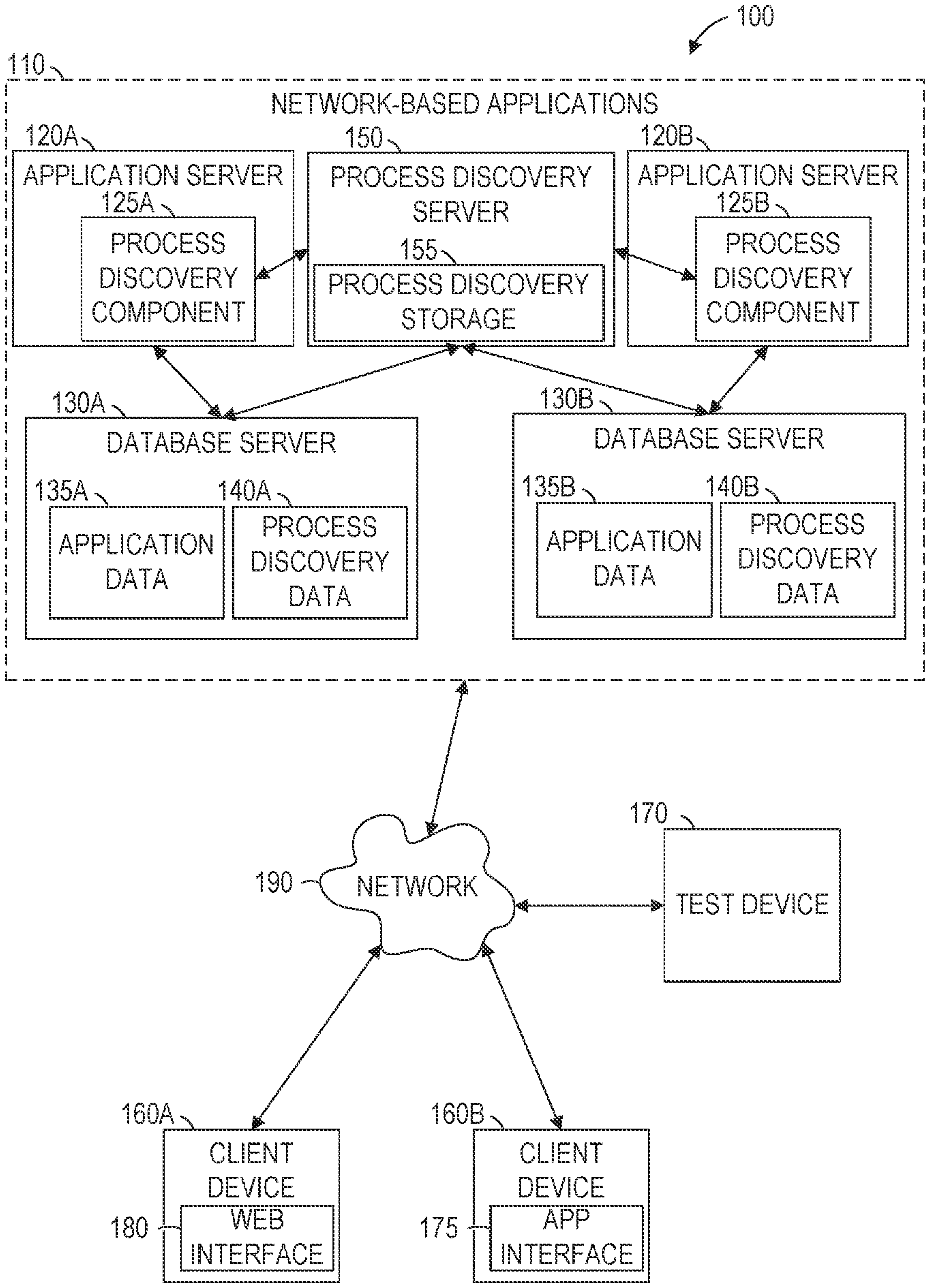
FIG. 1 is a network diagram illustrating a network environment suitable for automatically discovering executed processes, according to some example embodiments.

Example methods and systems are directed to automatically discovering executed processes. Executed processes generate log files on the systems in which they execute. The log files may be used for system debugging, usage and performance monitoring, or both. Information in the logs may be used to identify the executed processes. Some information in the logs is also stored in database tables, but some information, especially related to executable system objects, is available in the logs but not in the database tables.

As described herein, data is gathered from a log file on a first application server, a log file on a second application server, a database on a database server, or any suitable combination thereof. By correlating the data from different sources, executable process cells (XP-Cells) are identified. An XP-Cell is a unique combination of objects manipulated by an executed process on a system. In some example embodiments, each XP-Cell is assigned an indexed name defined by the component objects, parameters, object categories, and relationships to other XP-Cells. In various example embodiments, the XP-Cells include interactive user sessions, automated interactions, background jobs, or any suitable combination thereof.

Each XP-Cell has a corresponding executable process function (XP-Function). Each XP-Function may be assigned a name that describes its purpose (e.g., a name comprising original text and object codes of the analyzed server, original text and object codes of a database accessed by the analyzed server, or any suitable combination thereof). XP-Functions executed in sequence on a single application server are combined into a sequence referred to as an executable process chain (XP-Chain). Each XP-Function may be categorized as a dialog XP-Function performed via direct user interaction with the system, an interface XP-Function executed via an indirect user interface, a batch XP-Function executed via a background job, or any suitable combination thereof. Additionally, each XP-Function may be tagged as an active XP-Function with associated documents logs or a report XP-Function without documents logs. The report XP-Function may be used to list and report data in the system. Interface XP-Functions may be used to join end-to-end processes across systems, showing where the process starts, where the process ends, and how the process interacts with other processes from different systems. Example documents include Sales Orders, Delivery documents, and Billing documents.

Interface XP-Functions may be further categorized as receive/send XP-Functions and pure interface XP-Functions. A receive/send XP-Function communicates data between or among application servers. A pure interface XP-Function executes a function in the recipient application server based on interface messages (instructions) from another application server.

A batch job is a scheduled background program that runs on a regular basis without any user intervention. Batch jobs may be used to process high volumes of data and for executing processes that don't require user interaction. For example, once all order fields in a sales order are completed, a batch job may be scheduled to create delivery documents for the sales order.

Report XP-Functions are executed by system transactions and programs to read data from the database and generate output based on filters selected by an end user. Reports may be standard reports, custom reports, or ad hoc queries. The name of a report XP-Function may include components for the program name providing the XP-Function, the role used to execute the XP-Function, associated authorization objects, table names of tables used to gather data for the report, a function module, a timestamp, or any suitable combination thereof. Since many report XP-Functions access data without modifying it, many existing process discovery systems are unable to detect report XP-Functions. However, the reports generated by report XP-Functions are often critical to users of the system. By accurately detecting report XP-Functions, testing and migration of applications is improved.

The automatic process discovery server reconstructs end-to-end processes out of XP-Chains, even when the XP-Chains are executed on different application servers, based on log files and XP-Cells. Data regarding the end-to-end processes is stored in a process repository that links objects with processes. The log files and databases may be regularly monitored and the end-to-end process data may be updated without interrupting the applications provided by the application servers.

An XP-Function comprises one or more operations that create, modify, or delete a business object. A business object is an object (in the Object-Oriented Programming sense of the word) or data structure that represents a business entity. A business entity is any person, place, thing, document, or service that relates to a business. Example business entities include users (e.g., employees), customers, companies, sales orders, invoices, products, and services. A business object has a lifecycle in which the business object is created, used, and destroyed. For example, a business object for an employee is created when the employee is hired, maintained and modified during the employee's term of employment, and may be deleted or archived when the relationship with the employee is severed. A business process may correlate to a part of (or the entirety of) the lifecycle of a business object. For example, an individual sales order may be created, changed, and deleted and XP-Functions reflect and visualize these operations for the individual sales order. By way of example, the methods and systems described herein operate on business processes and business objects, but the inventive subject matter is not so limited.

Each time an application performs an XP-Function, the application identifies a type of business object being worked on to identify the business process. For example, if the user is working on a specific invoice with identifier 12314, the log or database entry generated by the application will include the identifier 12314 as a numeric or string value. Thus, each log file and database entry can be analyzed to determine if the identified invoice is involved and the business object identified accordingly. The identifier may include a string portion and a numeric portion, such as "Invoice 12314." For example, if the user is working on a specific customer with identifier 54321, the log file or the database includes the string "Customer 54321." Thus, the automatic processes discovery system can determine both if the business object being worked on is a Customer or an Invoice as well as the specific business object being worked on.

A test script may be generated for an identified end-to-end process. For example, a successful instance of the end-to-end process may be reconstructed from the logs and database by determining that the instance proceeded from the first XP-Function to the last XP-Function in the end-to-end process. The data used in the successful instance may be harvested as a test case. Running on test servers, test databases, or both, a repetition of the successful instance may be expected to also be a successful instance. Thus, a test script that repeats the successful instance may be created. By running the test script at a later time, proper functioning of the end-to-end process may be confirmed. For example, the test script may be run daily, after a software upgrade deployment, or both.

Existing test scripts may be disabled for a formerly identified end-to-end process that is no longer found to be executed. For example, the discovered processes may be stored along with a date stamp in the process repository that indicates the last time the process was observed. When testing, the test scripts may be run only for processes that were observed within a certain time frame (e.g., one week, one month, or one year before the test).

Additionally, the discovered end-to-end processes, along with their component XP-Chains and XP-Functions, may be used to direct process documentation. Migration of an application from one implementation to another (e.g., from a first platform using a traditional database relying on hard-disk storage to a second platform using an in-memory database implementation) can be done with reduced error by confirming which end-to-end processes are actually in use on the existing platform and verifying that those processes are tested and implemented correctly on the new platform. Likewise, by focusing the testing of the new platform on the processes actually used, the effort spent in testing may be reduced.

By comparison with existing methods of discovering processes, the methods and systems discussed herein reduce the level of effort expended in the discovery process and improve the accuracy of the discovered processes. Existing methods of process discovery are human-driven and thus are unable to actually monitor each and every XP-Function, resulting in missed XP-Functions, XP-Chains, and end-to-end processes. Additionally, since the human-driven process relies on human judgment rather than rigorous data evaluation, assumptions about which processes are performed may result in testing and maintenance of XP-Chains and end-to-end processes that are not used in practice.

By comparison with other automated methods of discovering processes, the methods and systems discussed herein are capable of identifying end-to-end processes that cannot be detected using existing methods. For example, front-end process mining detects user interactions with an application, but cannot detect fully automated process steps. As another example, tools that gather process data from a log file on a single server detect logged process steps on the single server, but cannot detect process steps performed on other servers. Tools that gather process data from a log file on a database server only detect logged process steps, but cannot detect background processing logs for automated steps and executable objects deployed on the application server and not stored in the database log files.

When these effects are considered in aggregate, one or more of the methodologies described herein may obviate a need for certain efforts or resources that otherwise would be involved in process discovery and testing. Computing resources used by one or more machines, databases, or networks may similarly be reduced. Examples of such computing resources include processor cycles, network traffic, memory usage, data storage capacity, power consumption, and cooling capacity.

FIG. 1 is a network diagram illustrating a network environment 100 suitable for automatically discovering executed processes, according to some example embodiments. The network environment 100 includes network-based applications 110, client devices 160A and 160B, a test device 170, and a network 190. The network-based applications 110 are provided by application servers 120A and 120B in communication with corresponding database servers 130A (storing application data 135A and process discovery data 140A) and 130B (storing application data 135B and process discovery data 140B). The processes provided by the application servers 120A-120B are monitored by a process discovery server 150, also in communication with the database servers 130A-130B. A process discovery component 125A or 125B runs on each of the application servers 120A-120B. The process discovery components 125A-125B are in communication with the process discovery server 150.

The application servers 120A-120B access the application data 135A-135B to provide one or more applications to the client devices 160A and 160B via a web interface 180 or an application interface 175. The application servers 120A-120B, the process discovery server 150, the database servers 130A-130B, the test device 170, and the client devices 160A and 160B may each be implemented in a computer system, in whole or in part, as described below with respect to FIG. 17. The client devices 160A and 160B may be referred to collectively as client devices 160 or generically as a client device 160.

The process discovery server 150 receives data regarding interactions with the application from one or more of the application servers 120A-120B, one or more of the database servers 130A-130B, or any suitable combination thereof. The process discovery components 125A-125B, installed on each of the application servers 120A-120B analyzes database and application server log files and automatically discovers executed processes. Data regarding the discovered processes may be created and stored in process discovery data 140A-140B, provided to the process discovery server 150 for aggregation in the process discovery storage 155, or any suitable combination thereof. The process discovery server 150 is used to pull and aggregate discovered processes on a regular basis from process discovery data 140A-140B. The process server sequences processes, combines object IDs with text and creates end-to-end processes out of the received process steps and associated data elements. The process server 150 has its own process discovery storage 155 that is used to generate test scripts for processes, to generate user interfaces showing information about XP-Functions, XP-Chains, and end-to-end-processes, or any suitable combination thereof.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 17. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application servers 120A-120B, the process discovery server 150, the database servers 130A-130B, the test device 170, and the client devices 160A-160B are connected by the network 190. The network 190 may be any network that enables communication between or among machines, databases, and devices. Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

The test device 170 interacts with the network-based application 110 like the client devices 160, but runs test scripts instead of providing client interactions. For example, before deploying an updated version of application software, the test device 170 may run a suite of test scripts against the updated version. If all test scripts execute successfully, software deployment continues. Otherwise, administrators or developers are notified of the errors so that the release-candidate software can be updated before deployment.

The process discovery server 150, in some example embodiments, is configured to request data from the application servers 120A-120B and the database servers 130A-130B periodically (e.g., daily) or in response to a user command (e.g., a user command received from the client device 160A via the web interface 180). Though FIG. 1 shows two application servers 120A-120B and two single database servers 130A-130B, more application servers, more database servers, or both are used in various example embodiments. For example, three application servers and two database servers may be used.

The process discovery data 140A-140B is created by the process discovery component 125A-125B for every system database analyzed by the process discovery server 150. In this way, the sensitive business data of the application servers 120A-120B is not imported into a separate database of the process discovery server 150. Instead, the process discovery server 150 analyzes the sensitive business data inside the application system itself (e.g., data for the application server 120B remains within the application server 120B and its database server 130B). The relationships between data elements and new data containing process definitions (e.g., in form of XP-Cell indexes) are stored in the process discovery data 140A-140B, the process discovery storage 155, or any suitable combination thereof. The process discovery data may also include system configuration parameters, executable objects, roles, user types, or any suitable combination thereof.

The process discovery server 150 collects and aggregates identified process discovery data from the process discovery data 140A-140B into the process discovery storage 155. In some example embodiments, the aggregated data only contains data fields that are relevant for process execution rather than all data fields that contain sensitive business information (such as prices, user IDs, ordered quantities, and the like). Alternatively, the sensitive business information may be brought into the process discovery storage 155 on demand and in compliance with strictly approved business requirements.

Figure 2:
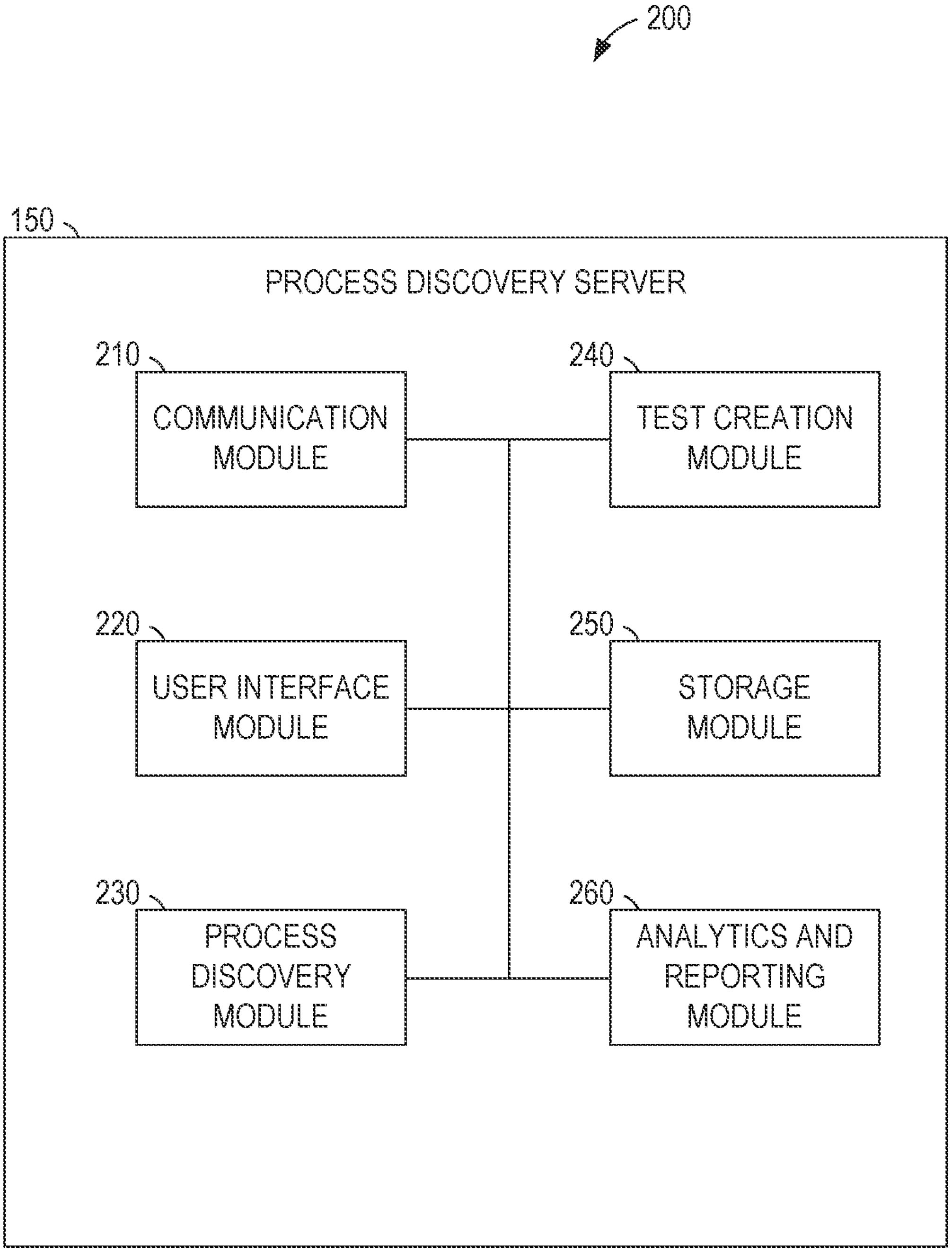
FIG. 2 is a block diagram of a process discovery server, according to some example embodiments, suitable for automatically discovering executed processes.

FIG. 2 is a block diagram 200 of a process discovery server 150, according to some example embodiments, suitable for automatically discovering executed processes. The process discovery server 150 is shown as including a communication module 210, a UI module 220, a process discovery module 230, a test creation module 240, a storage module 250, and an analytics and reporting module 260, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 receives data sent to the process discovery server 150 and transmits data from the process discovery server 150. For example, the communication module 210 may receive, from the application servers 120A-120B, log data that indicates functions performed on objects. The communication module 210 provides the data to the process discovery module 230, stores discovered process data in the database of the database server 130 via the storage module 250, or any suitable combination thereof. Communications sent and received by the communication module 210 may be intermediated by the network 190.

The process discovery module 230 receives reconstructed process data from the process discovery components 125A-125B from the application servers 120A-120B and the process discovery data 140A-140B from the database servers 130A-130B. For example, the process discovery module 230 may request the process data, the application servers 120A-120B may push the log data, or both). In some example embodiments, the process data is received via the communication module 210. Intermediate results and data for discovered processes may be stored in a database via the storage module 250. The process discovery module 230 evaluates the process data to identify XP-Functions text names, XP-Chains, and end-to-end processes. After being stored, the data may be accessed from the database servers 130A-130B, the storage module 250, or both depending on how aggregation was set up.

For example, multiple users on different client devices 160 each interact with different UIs provided by different application servers 120A-120B while working on a single business process (e.g., Standard Sales Order Process). Data gathered during each interaction is stored by the corresponding one of the application servers 120A-120B as log data on the application server 120A or 120B or data in the application data 135A or 135B of the database server 130A or 130B. The gathered data is analyzed by the process discovery component 125A or 125B, the process data is identified as XP-cells and their relations. The process data is stored in the process discovery data 140A or 140B, in the process discovery storage 155, or any suitable combination thereof, and sent to the process discovery module 230 to reconstruct processes and end-to-end processes.

The test creation module 240 generates test scripts to test the discovered individual process chains or end-to-end processes. Test scripts may be automatically created based on known successful executions of the discovered process chains or end-to-end process and automatically run whenever changes are made to the application servers 120A-120B. If a process chain or an end-to-end process is not executed for a predetermined period of time (e.g., a period of time determined by an administrator or otherwise, such as one week, one month, or one year) the test script may be removed from the set of scripts automatically run.

The UI module 220 causes presentation of a UI for the process discovery server 150 on a display (e.g., a display associated with an administrator of the process or a display of a device of another user interested in understanding and optimizing processes). The UI allows a user to select a process from a list of processes, to view process data for the selected process, to modify a process, to select a process or task of the process for generating a test script based on automatic discovery of the process or task, or any suitable combination thereof.

The analytics and reporting module 260 provides various graphs, charts, alerting key performance index (KPI) dashboards and reports using existing methods to analyze usage of processes and steps by business organization units, critical process paths, critical business object types and system configuration usage, usages of executables, patterns of execution, alerting on inconsistencies of execution (e.g. where wrong or unexpected system transactions or programs were used, where the same end-to-end process was executed in different ways, or both), analytical graphs showing which critical processes and executables must be included into test plans and covered in end-to-end testing. The analytics and reporting module 260 may also be used to show gaps or similarities of how the same process executed in separate systems. For example, if two systems are planned to be merged, e.g. if the application servers 120A and 120B are merged into a single application server, reports from the analytics and reporting module 260 can help to understand how process of those systems can be merged.

The process discovery module 230 uses process discovery data to analyze consistency of configured roles, usage and consistency of document types, relative importance of document types (e.g., if CBM0 processed 100,000 items and ZCB0 processed 10 items, CBM0 is a higher priority document type), usage of standard and custom transaction, number of transactions running majority/minority of the process, execution of the same/identical XP-Functions by automated batch jobs and dialogs at the same time, process consistency where the same end-to-end scenarios are configured in different ways in the system (duplicate configuration means duplicate cost of system ownership), critical end-to-end scenarios for test scope (e.g., if out of 200 scenarios 30 run 90°/% of the business, those 30 scenarios should be treated with a higher priority). Other reports generated by the analytics and reporting module 260 contain the number of transactions deployed in the process, the number of times XP-Function was triggered, a list of all transactions to be tested per Process Chain or Process Set, or any suitable combination thereof. The generated reports or analytics may also show gaps or similarities of how the same process executed in separate systems. For example, a report showing production in two systems can help an administrator to understand how a process of those systems can be merged.

FIGS. 3-9 are block diagrams of a database schema 300, according to some example embodiments, suitable for use by a process discovery server in automatically discovering executed processes. The database schema 300 may be used by the process discovery components 125A-125B in storing and accessing the process discovery data 140A-140B of the database servers 130A-130B. The database schema 300 includes a process discovery table 310, a process type table 410, a user type table 440, a business object table 470, an XP-Function table 510, an XP-Chain table 610, a process table 640, an object category table 710, an executable object table 740, an executed objects table 810, a single role of process type table 840, a single role of executable object table 910, and a composite role table 940.

In some example embodiments, the process discovery data 140A-140B includes XP-Cell data but not tables of XP-Functions or XP-Chains, which are stored in the process discovery storage 155. UI-specific data views may be created out of the process discovery data 140A-140B by the process discovery server 150 using remote data services such as Advanced Business Application Programming (ABAP) Core Data Services. For performance, a portion of the process discovery data 140A-140B may be replicated in the process discovery storage 155, reducing the network bandwidth consumed in UI generation.

The process discovery table 310 includes rows 330A, 330B, 330C, 330D, 330E, and 330F of a format 320. The process type table 410 includes rows 430A, 430B, 430C, 430D, 430E, and 430F of a format 420. The user type table 440 includes rows 460A and 460B of a format 450. The business object table 470 includes rows 490A, 490B, and 490C of a format 480. The XP-Function table 510 includes rows 530A, 530B, 530C, 530D, 530E, and 530F of a format 520. The XP-Chain table 610 includes rows 630A and 630B of a format 620. The process set table 640 includes rows 660A, 660B, 660C, 660D, 660E, 660F, and 660G of a format 650. The object category table 710 includes rows 730A, 730B, 730C, 730D, 730E, 730F, 730G, and 730H of a format 720. The executable object table 740 includes rows 760A, 760B, 760C, and 760D of a format 750. The executed objects table 810 includes rows 830A, 830B, 830C, 830D, 830E, 830F, 830G, and 830H of a format 820. The single role of process type table 840 includes rows 860A, 860B, 860C, and 860D of a format 850. The single role of executable object table 910 includes rows 930A, 930B, 930C, and 930D of a format 920. The composite role table 940 includes rows 960A, 960B, 960C, and 960D of a format 950.

The format 320 of the process discovery table 310 includes an object identifier field, a system identifier field, a client identifier field, an object category identifier field, a process type identifier field, an item type field, a user type field, an organization type field, a key executable object field, and an XP-Cell index field. Each of the rows 330A-330F stores process discovery data for a single event (e.g., updating data for an order). The event may consist of multiple field changes (e.g., changing a Value, Due Date, and Address of an order). The XP-Cell index field identifies the XP-Cell and it's indexed named is further used to identify the XP-Function used to generate the event. For example, the function identifier may identify the UI through which the user interaction was received, the script through which an automated interaction was received, or any suitable combination thereof.

The object identifier identifies the business object to which the event was applied. For example, in an invoice generation UI, the same item type would be used for multiple invoices, but the object identifier would be different for each invoice. The object category identifier field identifies the category of the identified object. The client identifier identifies the client device 160 that generated the event (e.g., with an IP address or other identifier). The system identifier identifies the application server 120 that executed the key executable object. The process type identifier may be cross-referenced with the process type table 410 to identify the process type of the event.

The user type identifier may be cross-referenced with the user type table 440 to determine if the event was performed by an interactive user session (dialog, as shown by the row 460A) or by an automated process (system, as shown by the row 460B). The organization type indicates the type of entity that performed the process (e.g., a customer, the application provider, a cloud services provider hosting the application, or any suitable combination thereof). The key executable object identifies the executed code that generated the event. The key executable object may be a stand-alone application, a dynamically-linked library, or any suitable combination thereof.

In some example embodiments, a user identifier for the event is not stored anywhere in the process discovery module 230, the storage module 250. or the process discovery table 310, allowing tracking of the role associated with an event but not the particular user, protecting user privacy. As shown in FIG. 1, the user-identifying data may be retained on the database servers 130A-130B and processed by the process discovery components 125A-125B so that the process discovery server 150 only accesses anonymized data.

The format 420 of the process type table 410 includes an object category field, a process type field, and a process type identifier field. Thus, the type of business process performed is determined by the category of the business object being manipulated and the process type identifier. As indicated by the row 430A, the process type for an order object with a process type identifier of CBM0 is a make to order (MTO) standard order. In the row 430B, an object of a different category (contract) and the same process type identifier (CBM0) has a service contract process type.

The format 480 of the business object table 470 includes an object identifier field and an object type field. Thus, the object type for a business object can be determined by looking up the object identifier in the business object table 470. By reference to the rows 490A-490C of the business object table 470, the business object of the rows 330A-330D is a sales object, the business object of the row 330E is a purchasing object, and the business object of the row 330F is a customer object.

The rows 530A-530F of the XP-Function table 510 are in the format 520, including a function identifier, an XP-Cell index, and a function description. Thus, the function description for an XP-Function can be determined by looking up the function identifier in the XP-Function table 510. By reference to the rows 530A-530D of the XP-Function table 510, the business process for the sales object of the rows 330A-330D includes events to create orders of different types, change a return, and create a contract. By reference to the row 530E, the business process of the row 330E for a purchasing object includes batch creating a purchase order. By reference to the row 530F, the business process of the row 530F for a customer object includes creating a customer master using a dialog.

The rows 630A and 630B of the XP-Chain table 610 are in the format 620, including a server identifier, a chain identifier, a function identifier, and a sequence number. An XP-Chain comprises one or more functions executed on a single server. Thus, the rows 630A-630B show XP-Chain chain001 running on server "A" (e.g., the application server 120A). The XP-Chain chain001 includes XP-Functions func001 and func002, executed in that order.

The format 650 of the process set table 640 includes a process set identifier field, a process set field, and a chain identifier field. Each process is executed within one and only one functional business line. That's why each process combines XP-Chains into groups of chains executed by the same functional business line and composed of one or more XP-Chains. The XP-Chains are stored as a list inside the Process without being sequenced in the process. The process may include XP-Chains that are executed in sequence if multiple XP-Chains are executed in order within the same business line. XP-Chains are not always connected to each other within one process and may be connected to XP-Chains of other processes.

For example, XP-Chains representing Service Sales Orders, Sales Contracts, Credit Memo are usually not connected directly. An XP-Chain for Service Sales Orders will be connected to an XP-Chain of Service Related Billing which in its turn belongs to a different process called Billing and may even be executed on a different server. That's why connections between XP-Chains are not defined and shown in the process, but in the end-to-end process that shows full connectivity between XP-Chain across multiple processes and application servers. Any of the XP-Chains may be the first, intermediate or the last XP-Chain in process. Any connections between XP-Chain is defined herein as an end-to-end scenario. The scenario can start and stop within one process inside one application server, connecting and sequencing one or more XP-Chains or it can start within one process on one application server and continue inside other processes on the same or different application server. Sequence of XP-Chains is not identified inside the process. Each XP-Chain may belong to one or more end-to-end scenario. The sequence of the XP-Chains is identified in the end-to-end scenario, where using document flow of the application server 120A or 120B the exact position of the XP-Chain is determined in the scenario.

The object category table 710 relates business object types to object categories. Thus, the rows 730A-730C show that sales business objects may be orders, contracts, or returns. The rows 730D-730E show that purchasing business objects may be purchase requisitions or purchase orders. The rows 730F-730G show that customer business objects may be customer masters or customer info-records.

The executable object table 740 relates executable objects to executable object names. Thus, the rows 760A-760D show four different executable objects that have the "Create Sales Order" name. This relationship allows a meaningful human-readable name to be presented while still distinguishing between different executable objects that perform similar functions. By tracking the executable objects that are used, targeted test scripts and automation scripts may be developed.

The executed objects table 810 tracks the execution of executable objects. Each of the rows 830A-830H has a timestamp at which the executable object indicated in the row was executed. Additionally, the task type field indicates the type of task performed by the executable object.

The single role of process type table 840 relates role identifiers and user identifiers to process types. The single role of executable object table 910 relates role identifiers and user identifiers to executable object types. Thus, each of the single role tables may be used to determine the role for a user accessing a process or an executable object, allowing the discovery process component 125A or 125B to anonymize records by replacing a user identifier with a role identifier. Additionally or alternatively, discovered role identifiers associated with processes may be used to help administrators assign roles to new users that need to perform execution of specific business processes.

The composite role table 940 maps a single composite role identifier for a user identifier to multiple single role identifiers. As can be seen in the rows 960A and 960C, multiple user identifiers may be mapped to a single role identifier (e.g., the process role identifier). Such user identifiers may still have different role identifiers for other types (e.g., the executable role identifier).

In addition to generated data by process discovery component in the schema 300 the process discovery module 230 may generate data for the tables of the schema 300 by processing log files, database tables, or both. The process discovery module 230 of the process discovery server 150, process discovery components 125A-125B of the application servers 120A-120B, or any suitable combination thereof analyze any type of processing log files, database tables or both independently of the files' location on the application servers 120A-120B or the database servers 130A-130B. Analyzing a combination of database server and application server logs provides comprehensive visibility of how processes are executed. In some example embodiments, the tables of the schema 300 are temporary stored on the database servers 130A-130B. The process discovery module 230 aggregates the tables of the schema 300 in the storage module 250 for storage on the process discovery server 150.

Figure 10:
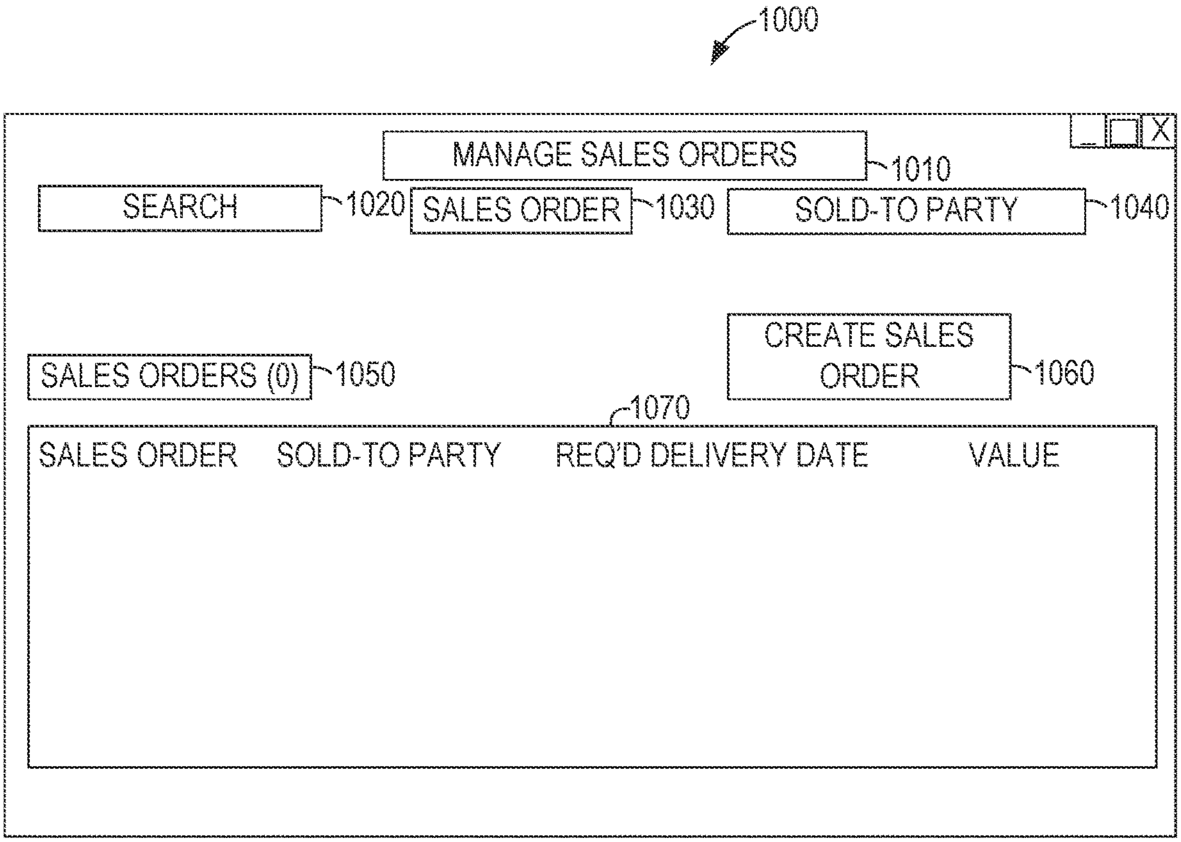
FIG. 10 is a diagram of a UI in an executed process suitable for automatic discovery, according to some example embodiments.

FIG. 10 is a diagram of a UI 1000 in an executed process suitable for automatic discovery, according to some example embodiments. The UI 1000 includes a title 1010; fields 1020, 1030, and 1040; text 1050; a button 1060; and an information area 1070. The title 1010 indicates that the UI 1000 is for managing sales orders. The fields 1020-1040 are operable to receive search terms for filtering sales order data presented in the information area 1070. The text 1050 indicates that the information area 1070 contains sales order data and provides the number of sales orders included in the information area 1070. The button 1060 is operable to create a sales order. The information area 1070 provides a sales order identifier, a name of the sold-to party, a required delivery date, and a value for each sales order responsive to the search terms. The search terms include plain-text search (in the field 1020), sales order identifier search (in the field 1030), and sold-to party search (in the field 1040).

Figure 11:
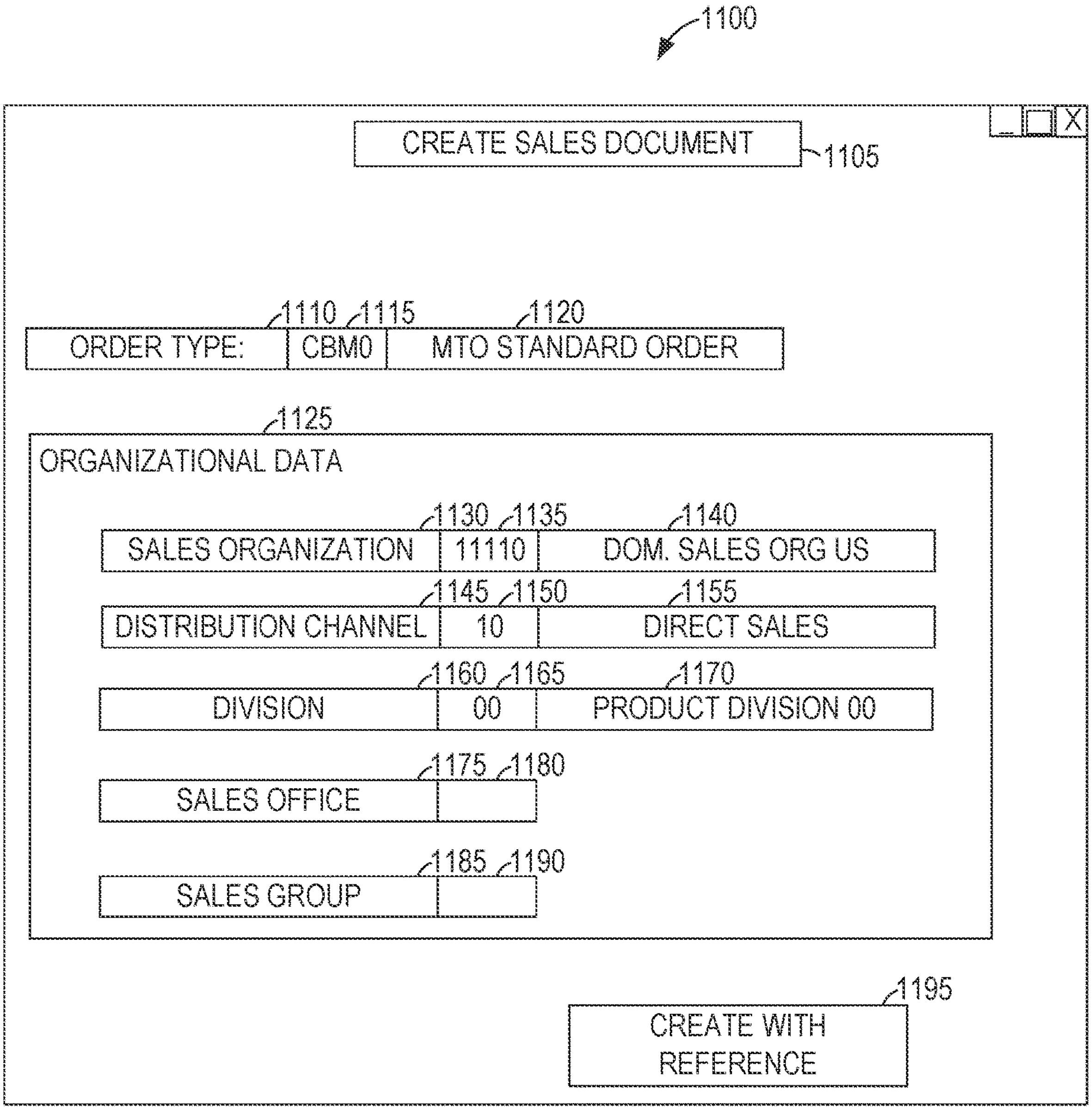
FIG. 11 is a diagram of a UI in an executed process suitable for automatic discovery, according to some example embodiments.

FIG. 11 is a diagram of a UI 1100 in an executed process suitable for automatic discovery, according to some example embodiments. The UI 1100 includes a title 1105; indicators 1110, 1130, 1145, 1160, 1175, and 1185; fields 1115, 1135, 1150, 1165, 1180, and 1190; descriptors 1120, 1140, 1155, and 1170; data area 1125; and button 1195. The title 1105 indicates that the UT 1100 is for creating a sales document. Thus, the UI 1100 may be displayed in response to operation of the button 1060 of the UI 1000. The button 1195 is operable to complete the sales document with reference to an already-existing quotation.

The indicator 1110 indicates that the field 1115 defines the order type of the sales document. The descriptor 1120 provides a description of the order type indicated in the field 1115. The fields 1115, 1135, 1150, 1165, 1180, and 1190 may be implemented as text fields, drop-down lists, combo boxes, or any suitable combination thereof.

The data area 1125 contains indicators, descriptors, and fields for the order. The sales organization type (indicator 1130) is 1710 (field 1135), which is a domestic sales organization in the United States (descriptor 1140). The distribution channel type (indicator 1145) is 10 (field 1150), which is a direct sales channel (descriptor 1155). The division selling the items sold (indicator 1160) is 00 (field 1165), product division 00 (descriptor 1170). The sales office (indicator 1175) and sales group (indicator 1185) have not yet been filled in (fields 1180 and 1190), and thus do not have corresponding descriptors.

Figure 12:
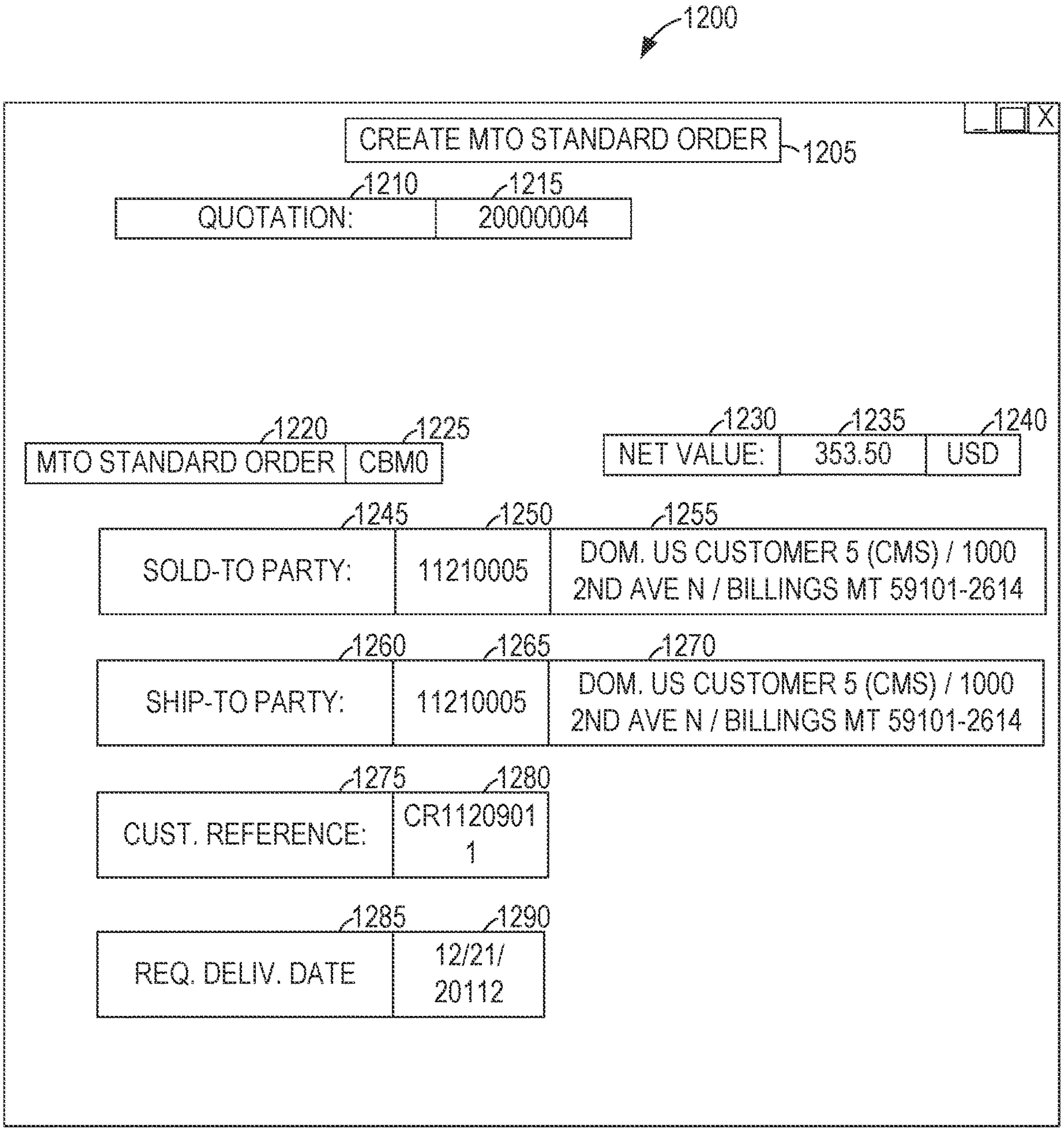
FIG. 12 is a diagram of a UI in an executed process suitable for automatic discovery, according to some example embodiments.

FIG. 12 is a diagram of a UI 1200 in an executed process suitable for automatic discovery, according to some example embodiments. The UI 1200 includes a title 1205; indicators 1210, 1230, 1245, 1260, 1275, and 1285; fields 1215, 1225, 1235, 1240, 1250, 1265, 1280, and 1290; and descriptors 1220, 1255, and 1270. The title 1205 indicates that the UI 1200 is for creating a standard order. The UI 1200 may be displayed in response to operation of the button 1195 of the UI 1100.

The indicator 1210 indicates that the field 1215 defines the quotation on which the sales order is to be based. The data shown in the fields 1225, 1235, 1240, 1250, 1265, 1280, and 1290 are populated by the application server 120A based on the quotation identified in the field 1215. The fields 1225, 1235, 1240, 1250, 1265, 1280, and 1290 may also receive user input to change the data from the quotation for the sales order.

As shown in the example UI 1200, the order type (field 1225) is a standard order (descriptor 1220); the net value of the order (indicator 1230) is $353.50 (fields 1235 and 1240); the sold-to party (indicator 1245) has identifier 1810005 (field 1250) and is a domestic U.S. customer located on 2nd Avenue in Billings, Montana (descriptor 1255); the ship-to party (indicator 1260) is the same as the sold-to party (field 1265) with the same description (descriptor 1270); the customer reference identifier (indicator 1275) is CR1809011 (field 1280); and the required delivery date (indicator 1285) is Dec. 21, 2018 (field 1290).

The UIs 1000-1200 may be generated by one or more of the application servers 120A-120B. The user interactions with the UIs 1000-1200 may result in log entries being added to log files stored on the application servers 120A-120B, with each log entry identifying a document taken by an XP-Function as input, provided by an XP-Function as output, or both. For example, a log entry related to the UI 1000 may, in response to operation of the button 1050 labeled "Create Sales Order," include an identifier of a newly created sales order document. A log entry related to the UI 1100 may also include the identifier of the sales order document, logging the changes made by the user. The log entries for the UIs 1000 and 1100 may be in separate log files on separate ones of the application servers 120A-120B. Thus, by accessing the log files on multiple application servers, the process discovery component 125A-125B, the process discovery server 150 or both is enabled to correlate the log entries referring to the same document and identify, XP-Functions, XP-Chains, and end-to-end processes involving the document.

Figure 13:
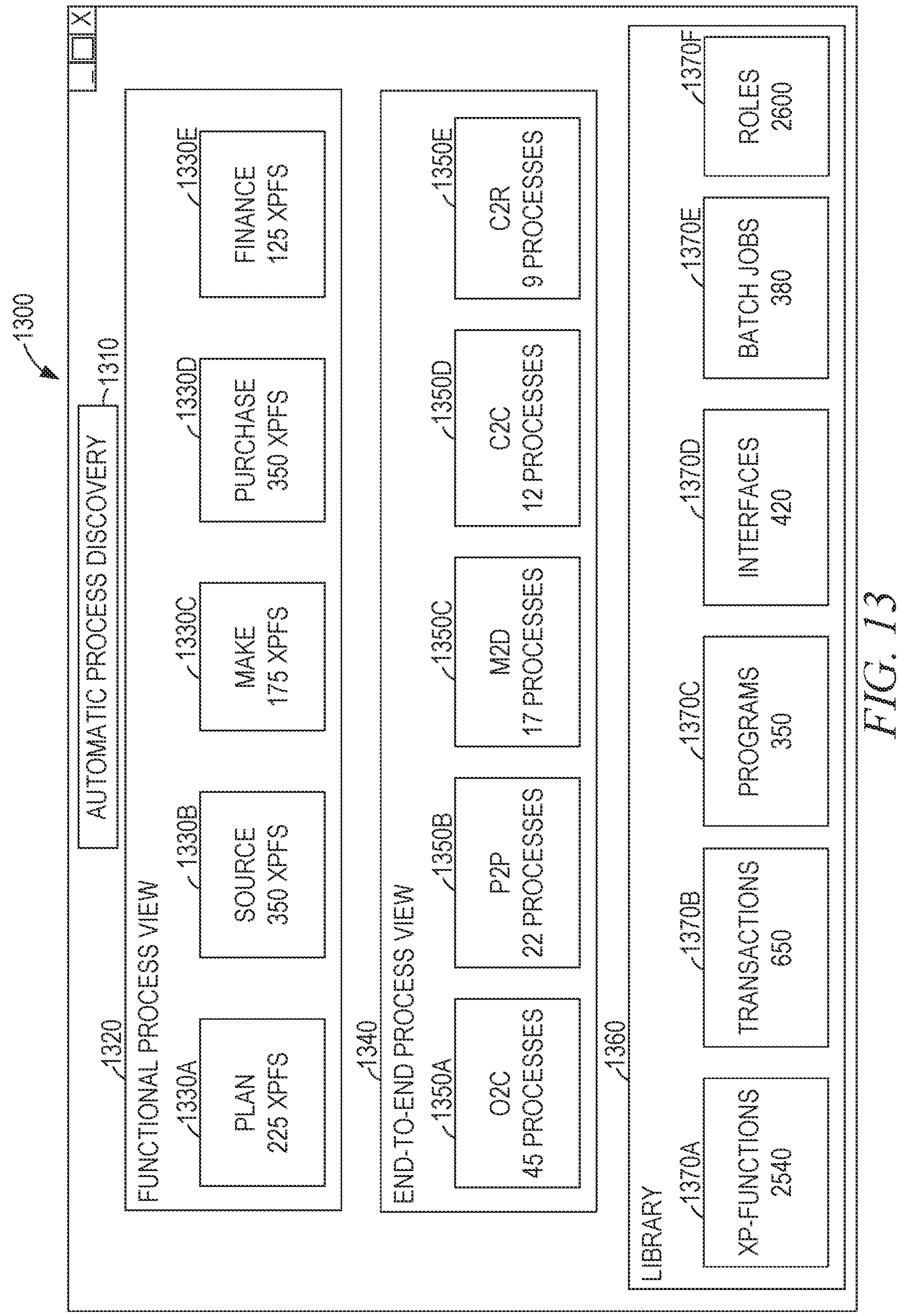
FIG. 13 is a diagram of a UI for navigating among process areas, processes, functions, transactions, programs, interfaces, batch jobs, and roles, according to some example embodiments.

FIG. 13 is a diagram of a UI 1300 for navigating among process areas, processes, functions, transactions, programs, interfaces, batch jobs, and roles, according to some example embodiments. The UI 1300 includes a title 1310; buttons 1330A, 1330B, 1330C, 1330D, and 1330E in a functional process view area 1320; buttons 1350A, 1350B, 1350C, 1350D, and 1350E in an end-to-end process view area 1340; and buttons 1370A, 1370B, 1370C, 1370D, 1370E, and 1370F in a library area 1360. The title 1310 indicates that the UI 1300 is displaying data regarding automatically discovered processes. The UI 1300 is generated using data resulting from automatic discovery of executed processes.

Each of the buttons 1330A-1330E, 1350A-1350E, and 1370A-1370F is operable to cause the display of another UI with more detail regarding the XP-Functions or processes associated with the button. The functional processes may be automatically organized in a hierarchy with functional area at the highest level, then functional processes, process set, and XP-Chain at the lowest level. For example, XP-Functions for standard orders may be associated with a Deliver/Sales/Order/Standard Order leaf node of the hierarchy. For example, the button 1330D is operable to cause display of a UI with information regarding the XP-Functions (accessed from the XP-Function table 510) in the "sales" functional process.

Each of the buttons 1350A-1350E is associated with a type of end-to-end process. For example, the button 1350A is operable to display more information regarding "O2C," or "order-to-cash" processes. The end-to-end processes are assembled using a bottom-up approach. Depending on the core functional area of the end-to-end process, tables or log files are selected and accessed. For example, order-to-cash processes are in the "sales" core functional area and "P2P," or "purchase-to-pay" processes, are in the "purchase" core functional area.

For each event that creates a document, the document number of the created document and the XP-Function that created the document are identified. The document number is used to identify other XP-Functions that access or modify the document. Additionally, if the event that created the document operated on a parent document, the relationship between the parent document and the created document is noted (e.g., stored in a database table). If there is no parent document, the XP-Function that created the document is the start XP-Function of an end-to-end process and the XP-Chain that contains the XP-Function is the start XP-Chain. If there is a parent document, the XP-Function and the corresponding XP-Chain is not the start XP-Function and the tracing of the process continues backwards through predecessor XP-Functions.

In either case, the automatic process discovery component 125A-125B, the process discovery module 230, or both follows the document flow through the XP-Functions, from the first XP-Function and the corresponding XP-Chain that initiates a process, to the last XP-Function and the corresponding XP-Chain that operates on a document without creating a child document. For example, a sequence of XP-Functions may create a standard order, a delivery document, a transfer order, an invoice, an accounting document, a lean return, a return delivery document, a credit memo for a return, and another accounting document. By operation of one of the buttons 1350A-1350E, another UI that shows the processes of the indicated type is displayed. By selection of an individual end-to-end process, additional information regarding the component XP-Functions, XP-Chains, documents, or any suitable combination thereof is displayed.

The button 1370A is operable to cause display of a UT with additional information regarding the discovered XP-Functions. Each XP-Function is stored once in the library. The library may be organized in a hierarchy with functional area at the highest level, then functional processes, process set, and XP-Chains at the lowest level. For example, XP-Functions for standard orders may be associated with a Deliver/Sales/Order/Standard Order leaf node of the hierarchy.

XP-Functions that are classified as "reports" or "send/receive interface functions" may be used in multiple functional processes and corresponding end-to-end processes. In some example embodiments, naming conventions may be used to identify such XP-Functions. For example, "IDoc: Receive" may be used at the beginning of an XP-Function name to indicate that the XP-Function receives interface messages that trigger the subsequent event in the process or "IDoc: Send" may be used at the beginning of an XP-Function name to indicate that the XP-Function sends interface messages that trigger the subsequent event in the process. The core of the XP-Function name is identified automatically from the key XP-Cell data elements. Data element names may be combined fully or partially and inserted into XP-Function name exactly as they are represented in the analyzed application server or database server. This may allow an end user to easily recognize and analyze the processes as their names automatically reflect what they used to see in the system when they execute the process. Other methods hard code, re-map or map manually any objects identified in system logs to process steps using consultants knowledge or functional process documentation.

The UI 1300 may be of use to business users that want to navigate and analyze the discovered processes and XP-Functions using the buttons 1330A-1330E and 1350A-1350E of the functional process view area 1320 and the end-to-end process view area 1340. Additionally, the UI 1300 may be of use to information technology users that want to navigate and analyze the discovered processes and XP-Functions using the buttons 1370A-1370F of the library area 1360.

FIG. 14 is a diagram of a UI 1400 for displaying functions in executed processes, according to some example embodiments. The UI 1400 includes a title 1410; headers 1420, 1425, 1430, 1440, 1450, 1460, 1470, and 1480; and result rows 1490A, 1490B, 1490C, and 1490D. The title 1410 indicates that the UI 1400 is displaying data from a process discovery repository. The UI 1400 is generated using data resulting from automatic discovery of executed processes and may be displayed in response to operation of the button 1330B of FIG. 13.

The headers 1440-1480 indicate that each of the result rows 1490A-1490D includes information for an XP-Function: the name of the function, the XP-Chain the XP-Function is a part of, the sequential position of the XP-Function in the XP-Chain, the XP-Cell corresponding to the XP-Function, and the key executable object providing the XP-Function. Additionally, the headers 1420, 1425, and 1430 indicate that the functional area, functional process, and process set for the XP-Chain are provided. A functional area is an aggregation of processes that are performed within the same highest level application component. Thus, the functional area aids users in navigating a UI to find a process, process set, XP-Chain, or XP-Function of interest. A functional process is a logical category within a functional area. In the example of FIG. 14, "sales" functional processes are within the functional area "deliver." In some example embodiments, an additional column is displayed for the date and time the XP-Function was last used.

As can be seen in the UI 1400, each of the XP-Functions of the result rows 1490A-1490D is part of the "MTO standard order" XP-Chain, which is in the "order" process set, the "sales" functional process and the "deliver" functional area. The "MTO standard order" XP-Chain begins with either creating a sales order for free items by a dialog user (row 1490A) or creating a sales order for standard items by an automated background job (row 1490B), as indicated by the sequence value 1 for each of those two XP-Functions. In this XP-Chain, the second XP-Function is a change sales order of free items and the third XP-Function changes the sales order for standard items.

The XP-Cell values may be generated by concatenating multiple values to generate a unique string that can be meaningfully parsed. For example, the first character of each XP-Cell value is "A" or "B." According to the user type table 440, "A" indicates that the key executable object corresponding to the XP-Cell was executed by a dialog (e.g., interactively) and "B" indicates that the key executable object was executed by a system (e.g., programmatically). As another example, each XP-Cell includes either an "_I_" or a "_U_." The "_I_" indicates that an object was created and the "_U_" indicates that an object was changed.

Continuous monitoring allows for (close to real-time) dashboards information for end-to-end processes, XP-Chains, and XP-Functions. The UI 1400 is an example of such a continuous monitoring dashboard. As additional information is gathered by the process discovery server 150, the rows 1490A-1490D are updated. Additional rows are added in response to detection of additional XP-Functions, existing rows are removed in response to detecting that the XP-Function is not used for a predetermined period of time (e.g., one week or one month), or both. The analytics and reporting module 260 may be used to analyze consistency of configured roles, usage and consistency of document types, criticality of document type that must be tested (CBM0 processed 100,000 Items where ZCB0-processed 10 items), usage of standard and custom transaction, number of transactions running majority/minority of the process, execution of the same/identical XP-Functions by Automated batch job and Dialog at the same time, process consistency where the same end-to-end scenarios are configured in different ways in the system (duplicate configuration means duplicate cost of system ownership), critical end-to-end for test scope (out of 200 scenarios 30 run 90% of the business).

Standard process discovery is usually based on event logs of a single software system. This is often not sufficient to capture the whole business process. People may use other software systems as part of their daily work (e.g., XP-Functions provided by a second software system). In contrast to traditional logfile-based backend process mining, example systems and methods described herein combine data gathered from logs of multiple sources of application server and related database server simultaneously for multiple software systems. For example, by analyzing a single log file, a single XP-Chain may be identified, but the end-to-end process involving multiple XP-Chains on multiple application servers 120A-120B cannot be identified. Instead, by analyzing log files of multiple application servers 120A-120B and correlating the XP-Chains based on the document being modified, the end-to-end process is identified.

Systems that analyze only application server log files may identify events, but without identifying corresponding data log in a database server. The application server contains of all processing log files (e.g. system workload) for complete and incomplete process events (e.g. if a dialog user started creating Sales Order and for any reason stopped half a way through without saving and sending the order, application log files will contain of all executed objects triggered by the dialog user; if an interface message received in the system and cancelled without releasing the message to create a Purchase order, the application log files will contain all executed objects for this incomplete event). By analyzing only application server logs the events that didn't take place may be included in the process and the correct process steps cannot be identified. Database server logs may not contain executable objects particularly for initial events creating the documents, automated events where process executed via batch jobs, interfaces or both. By analyzing only database logs, many executables cannot be identified for process steps.

In some example embodiments, the process discovery module 230 of the process discovery server 150 assigns names to XP-Functions based on the information gathered about each XP-Function from log files, databases, or both. Relevant process data elements' names are combined fully or partially and inserted into XP-Function name exactly as they are represented in the analyzed application server or database server. For example, the name may be of the format <Executable Type>_<Document Type>_<Document Category>_<Table>_<Item Category>_<User Type>_<Task Type>. Reconstructed process discovery naming convention may be easily understood and recognized by system user, owners, testers, analysts or both of the analyzed system.

To illustrate, the name DialogCreate_TA_C_VBAK_CBXN_A_I would be assigned to an XP-Cell of executable type Dialog that performs a Create task for a TA document in the C category, wherein the data for the document is stored in the VBAK table, the item category is CBXN, the user type is A, and the task type is I. The strings in the names of the XP-Cell may be mapped to definitions and create a corresponding XP-Function with the name Dialog: Create Standard Order, Service Item, VBAK. For example, the C document category may refer to order documents, the TA document type may refer to standard orders, the VBAK table may refer to a Sales Document: Header Data table, the CBXN item category may refer to a service item, an A user type may refer to a manual user type, and so on.

Another example XP-Function name is Batch:Create Standard Delivery, Standard Item, LIKP that derives from XP-Cell BatchCreate_LF_J_WithoutWM_TAN_A_I. This XP-Function name indicates that the executable type is Batch, the function performs a Create task for an LF document in the J category, the data for the document is not stored in a table (as indicated by the WithoutWM flag), the item category is TAN, the user type is A, the task type I, and the warehouse management flag (not included in the previous example) is WithoutWM, the table may refer to LIKP a SD Document: Delivery Header Data. In this example, the J document category refers to delivery documents, the LF document type refers to a standard delivery, and the TAN item category refers to a standard item. By defining XP-Functions using this method, the detailed name of the end-to-end scenario where XP-Function is executed can be identified.

XP-Function assigned attributes may include components for system identifier, client identifier, user type, transaction code, program, number of transaction or program occurrences, role, authorization object, authorization field and field value, number of items, number of documents, material type, organizational structure objects, created on or changed on date and timestamp, where used in process, table name text, table fields used, or any suitable combination thereof.

Data gathered from log files, database tables, or both include a document number, an item number, a document type, a document category, an organizational structure, a purchase order number, a sender port, a receiver port, a message, message attributes, a process code, a function module comprising an XP-Function, a role, an authorization object, a timestamp, or any suitable combination thereof. The gathered data is used to identify the XP-Function, associate the XP-Function with a document, associate the XP-Function with a role, associate the XP-Function with a predecessor XP-Function, associate the XP-Function with a successor XP-Function, associate the XP-Function with an XP-Chain, associate the XP-Function with an end-to-end process, or any suitable combination thereof.

FIG. 15 is a diagram of a UI 1500 for displaying functions in executed processes, according to some example embodiments. The UI 1500 includes a title 1510; informational area 1515; headers 1520, 1525, 1530, 1540, 1550, 1560, 1570, and 1580; and result rows 1590A, 1590B, and 1590C. The title 1510 indicates that the UI 1500 is displaying data from a process discovery repository. Like the UI 1400, the UI 1500 is generated using data resulting from automatic discovery of executed processes.

The informational area 1515 indicates that the result rows 1590A-1590C are part of the same end-to-end process (order-to-cash, in the example of FIG. 15), the same end-to-end scenario ("O2C. Order for MTO standard order, standard item, billing expected, pricing expected"), and the same functional area ("deliver"). In some example embodiments, these three columns are shown as additional headers, with values shown for each of the result rows 1590A-1590C.

The headers 1530-1580 indicate that each of the result rows 1590A-1590D includes information for an XP-Function: the name of the function, the XP-Chain the XP-Function is a part of, the sequential position of the XP-Function in the XP-Chain, the XP-Cell corresponding to the XP-Function, and the key executable object providing the XP-Function. Additionally, the headers 1520 and 1525 indicate that the functional process and process set for the XP-Chain are provided. In some example embodiments, an additional column is displayed that shows the date and time the XP-Function was last used. An XP-Chain sequence column may also be displayed, containing the sequence of the XP-Chain within the end-to-end scenario. Example values of the XP-Chain sequence for the results rows 1590A-1590C are 1, 1, and 2, respectively.

As can be seen in the UI 1500, each of the XP-Functions of the result rows 1590A-1590B is part of the "MTO Standard Order" XP-Chain, which is in the "order" process set, the "sales" functional process, and the "deliver" functional area. This XP-Chain begins with the "Batch create order, MTO standard order, standard item" XP-Function (sequence 1), followed by the "Dialog Change Order, MTO Standard Order, Standard Item" XP-Function (sequence 2). The XP-Function of the result row 1590C is part of the "Standard Invoice" XP-Chain, which is in the "invoice" process set, the "billing" functional process, and the "deliver" functional area. The "Dialog Create Invoice, Standard Invoice, Standard Item" XP-Function (sequence 3) follows the XP-Function of the row 1590B in the end-to-end scenario.

The result row 1590C shows the "Dialog Create Invoice, Standard Invoice, Standard Item" XP-Function is part of the "Standard invoice" XP-Chain of the "invoice" process set in the "billing" functional process of the "deliver" functional area. Despite being in a different functional process and process set, this XP-Function is in the same functional area, end-to-end scenario, and end-to-end process as the XP-Functions of the rows 1590A-1590B.

Figure 16:
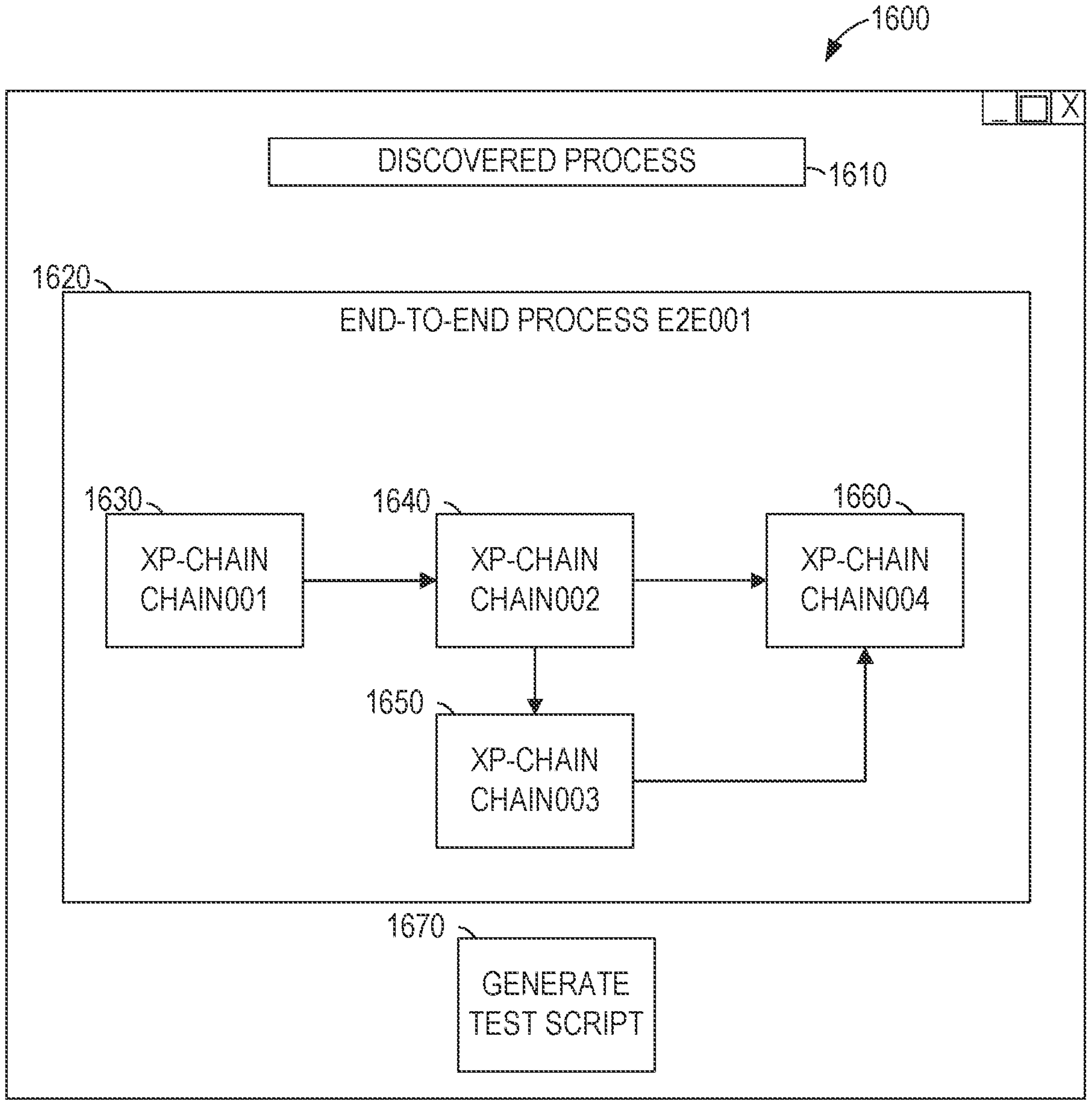
FIG. 16 is a diagram of a UI for displaying a discovered executed process, according to some example embodiments.

FIG. 16 is a diagram of a UI 1600 for displaying a discovered executed process, according to some example embodiments. The UI 1600 includes the title 1610; information area 1620; XP-Chain elements 1630, 1640, 1650, and 1660; and button 1670. The UI 1600 displays information about a set of XP-Chains that comprise the end-to-end process E2E001, as indicated in the label for the information area 1620 and the title 1610. In some example embodiments, prior to the display of the UI 1600, a UI may be presented that comprises a list of discovered processes. In response to a selection of one of the discovered processes, the UI 1600 is displayed, including information about the selected process.

Two sequences of XP-Chains are presented as different options for performing the end-to-end process. In one sequence, XP-Chain chain001 is followed by XP-Chain chain002, and finishes with XP-Chain chain004 (as shown by XP-Chain elements 1630, 1640, and 1660). In a second sequence, XP-Chain chain003 is inserted between XP-Chain chain002 and XP-Chain chain004 (as shown by XP-Chain elements 1630-1660).

Each XP-Chain is a series of XP-Functions performed by a single application server 120A-120B. Thus, the end-to-end process E2E001 is performed by different functions on at least two and as many four different application servers.

The button 1670 may be operable to cause creation of a test script that tests the end-to-end process being viewed in the UI 1600. For example, in response to operation of the button 1670, a test script may be generated that tests all of the XP-Chains shown in the information area 1620. The test script may be automatically deployed to the test device 170 and periodically executed by the test device 170.

Figure 17:
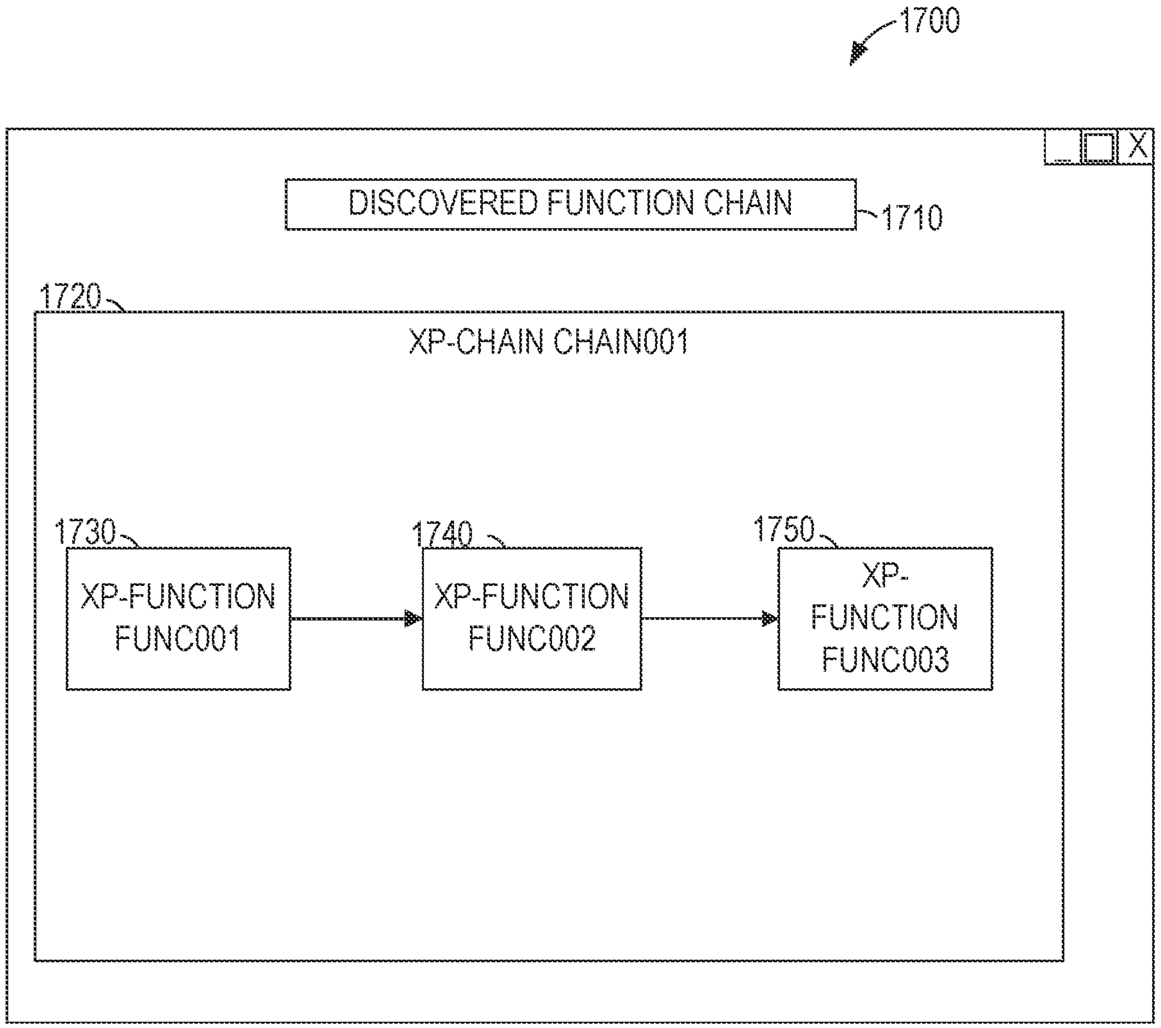
FIG. 17 is a diagram of a UI for displaying a discovered function chain in an executed process, according to some example embodiments.

FIG. 17 is a diagram of a UI 1700 for displaying a discovered function chain in an executed process, according to some example embodiments. The UI 1700 includes the title 1710; information area 1720; and XP-Function elements 1730, 1740, and 1750. The UI 1700 displays information about a set of XP-Functions that comprise the XP-Chain chain001, as indicated in the label for the information area 1720 and the title 1710.

As shown in FIG. 17, the XP-Chain chain001 comprises XP-Function func001, XP-Function func002, and XP-Function func003, performed in that order (as shown by XP-Function elements 1730-1750). Since each XP-Chain is a series of XP-Functions performed by a single application server, all three of the XP-Functions shown in FIG. 17 are performed on a single application server.

Figure 18:
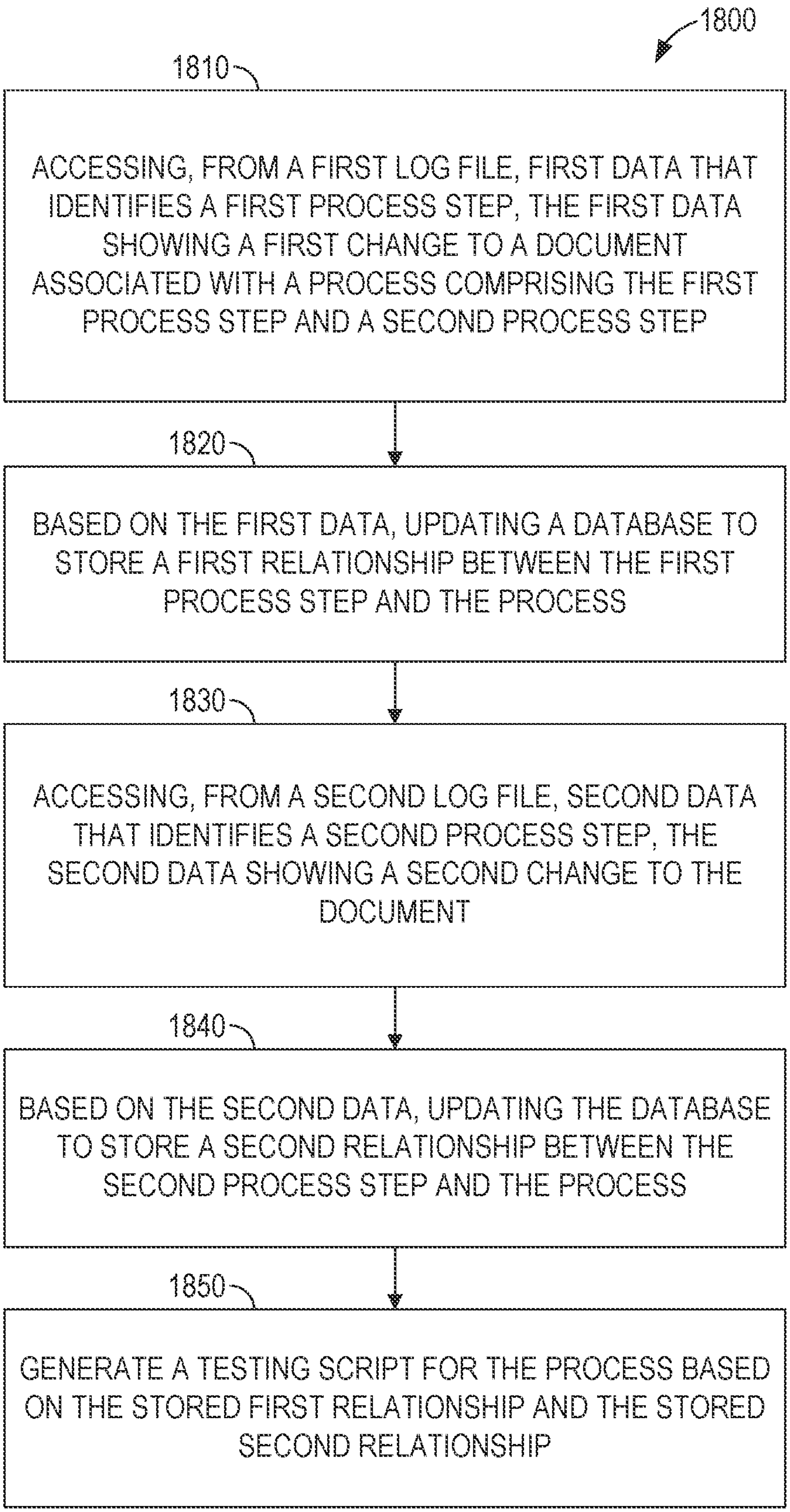
FIG. 18 is a flowchart illustrating operations of a method suitable for automatically discovering an executed process and generating a testing script for the discovered process, according to some example embodiments.

FIG. 18 is a flowchart illustrating operations of a method 1800 suitable for automatically discovering an executed process and generating a testing script for the discovered process, according to some example embodiments. The method 1800 includes operations 1810, 1820, 1830, 1840, and 1850. By way of example and not limitation, the method 1800 is described as being performed by the devices, modules, and databases of FIGS. 1-0.

In operation 1810, the process discovery component 125A, the process discovery module 230 or both accesses, from a first log file of a first application server (e.g., the application server 120A), database server (e.g. the database server 130A) or both first data that identifies a first process step, the first data showing a first change to a document associated with a process comprising the first process step and a second process step. For example, data corresponding to the XP-Function element 1730 of FIG. 17 may be accessed. The XP-Function func001 is part of the XP-Chain chain001, which is part of the end-to-end process E2E001, as shown by FIGS. 16-17. In some example embodiments, the accessed data is text that identifies a key executable object, a function name, and a document. For example, and with reference to the result row 1590C of FIG. 15: "Dialog Create Invoice, Standard Invoice, Standard Item; VF01."

The first log file may be a structured query language (SQL) log that stores data for SQL commands sent to or executed by a database server (e.g., the database server 130A), a call monitor log that stores data for functions executed by the application server (e.g., the application server 120A), a workload log that monitors the workload of the application server, a business transaction log that stores data regarding objects being manipulated by a function or database, or any suitable combination thereof.

The first log file may contain millions of records that cover all process and system background activities. Some log entries refer to executed transactions that are executed without saving data. For example, a user may create an order but change their mind and exit the transaction without saving, creating a log entry without an associated document. These log entries may be skipped. Thus, XP-Functions may be defined based on associated fields such as task type, timestamp, date, system identifier, client identifier, or any suitable combination thereof. Log file entries may be correlated with database records for XP-Functions to determine which XP-Function is referred to by each log file entry. Since log files may be periodically deleted (e.g., every 24 or 48 hours), data regarding discovered XP-Functions, XP-Chains, or processes may be stored in a database using the schema 300 of FIGS. 3-9 for persistent storage. In some example embodiments, a UI is presented to a user that presents a relationship between XP-Functions and executables.

In some example embodiments, the process step is run by a system transaction. For example, a transaction VA01 or a FioriApp (AppID F1814) and VA01 can be used by the system in a Create Order process step. Regardless how the order was created, the system database (e.g., in the application data 135A) will have a record that an order (e.g., with identifier SO000123) was saved, but the database doesn't keep the records of what executable object was used in the Application Layer. Thus, the additional data gathered by the process discovery component (e.g., the process discovery component 125A) stored in the process discovery data (e.g., the process discovery data 140A) supplements the application's own logs. As a result, the process discovery server 150 can collect and link the process discovery data to tasks reflecting business events. Accordingly, at the point of the event, the process discovery server 150 is enabled to identify the process steps and the executable that performed them.

The process discovery module 230, in operation 1820, updates, based on the first data, a database to store a first relationship between the first process step and the process. For example, data may be added to one or more of the process discovery table 310, the XP-Function table 510, the XP-Chain table 610, and the process table 640. The process table 640 stores relationships between processes and XP-Chains and the XP-Chain table 610 stores relationships between XP-Chains and XP-Functions (each of which corresponds to a process step).

In operation 1830, the process discovery module 230 accesses, from a second log file of a second application server (e.g., the application server 120B), second data that identifies a second process step, the second data showing a second change to the document. For example, data corresponding to the XP-Function element 1740 of FIG. 14 may be accessed. The XP-Function func002 is part of the XP-Chain chain001, which is part of the end-to-end process E2E001, as shown by FIGS. 16-17. In some example embodiments, the accessed data is text that identifies a key executable object, a function name, and a document. For example, and with reference to the result row 1590B of FIG. 15: "Dialog Change Order, MTO Standard Order, Standard Item; VA02."

The process discovery module 230, in operation 1840, updates, based on the second data, the database to store a second relationship between the second process step and the process.

In operation 1850, the test creation module 240 generates a testing script for the process based on the stored first relationship and the stored second relationship. For example, the generated testing script may invoke both the first process step (e.g., an XP-Function) and the second process step based on both process steps being part of the discovered process.

After the testing script is created, the communication module 210 provides the testing script to a test server or test client (e.g., the client device 160B). Thereafter, the testing script is automatically executed to detect errors in the discovered process.

Thus, by use of the method 1800, log files recording functions provided by different application servers are aggregated to determine the component process steps of a process. By comparison with manual processes, time and effort is saved by using automation to discover end-to-end processes. Furthermore, since the process discovery is based on data gathered from multiple application servers, database servers or both instead of a single application server or a single database server more complicated end-to-end processes can be discovered, further saving time and effort of users of the automatic process discovery server and computing resources involved in manual correlation of process steps performed on different servers.

It should be noted that processes may include optional or alternative steps that are not performed in every iteration of the process. Accordingly, multiple execution paths for the process may exist. Historical log files covering a few months and millions of records may be analyzed to observe and automatically reconstruct executed process from the past events. Over time, the complete state space of the process is observed and mapped using this approach. Thus, the process discovery system described herein is automated and scalable.

In view of the above described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a method comprising: accessing, by one or more processors, from a first log file, first data that identifies a first process step, the first data showing a first change to a document associated with a process comprising the first process step and a second process step; based on the first data, updating a database to store a first relationship between the first process step and the process; accessing, by the one or more processors, from a second log file, second data that identifies a second process step, the second data showing a second change to the document; based on the second data, updating the database to store a second relationship between the second process step and the process; and generating a testing script for the process based on the stored first relationship and the stored second relationship.

In Example 2, the subject matter of Example 1 includes, causing a user interface to be presented on a display device, the user interface comprising an option to cause the testing script to be generated; and wherein the generating of the testing script is in response to a selection of the option.

In Example 3, the subject matter of Examples 1-2 includes, wherein: the updating of the database to store the first relationship between the first process step and the process comprises updating a row of the database, the row of the database further storing an identifier of a chain of process steps executing on a single application server and a value that indicates the position of the first process step relative to other steps of the chain.

In Example 4, the subject matter of Example 3 includes, running the testing script.

In Example 5, the subject matter of Examples 1-4 includes, wherein: the first process step is an executable process function (XP-Function).

In Example 6, the subject matter of Examples 1-5 includes, wherein: the accessing of the first log file comprises accessing the first log file from a first server via a network; and the accessing of the second log file comprises accessing the second log file from a second server via the network.

In Example 7, the subject matter of Examples 1-6 includes, wherein: the database is a first database; and further comprising: accessing, from a second database, third data that identifies a third process step, the third data showing a change to a second document; based on the third data, updating the first database to store a third relationship between the third process step and the process.

In Example 8, the subject matter of Examples 1-7 includes, wherein the first process step comprises a user interaction.

In Example 9, the subject matter of Examples 1-8 includes, wherein the first process step comprises an automated interaction.

In Example 10, the subject matter of Examples 1-9 includes, wherein the first data further identifies a role associated with the first process step.

Example 11 is a system comprising: a memory that stores instructions; and one or more processors configured by the instructions to perform operations comprising: accessing, from a first log file, first data that identifies a first process step, the first data showing a first change to a document associated with a process comprising the first process step and a second process step; based on the first data, updating a database to store a first relationship between the first process step and the process; accessing, from a second log file, second data that identifies a second process step, the second data showing a second change to the document; based on the second data, updating the database to store a second relationship between the second process step and the process; and generating a testing script for the process based on the stored first relationship and the stored second relationship.

In Example 12, the subject matter of Example 11 includes, wherein the operations further comprise: causing a user interface to be presented on a display device, the user interface comprising an option to cause the testing script to be generated; and wherein the generating of the testing script is in response to a selection of the option.

In Example 13, the subject matter of Examples 11-12 includes, wherein: the updating of the database to store the first relationship between the first process step and the process comprises updating a row of the database, the row of the database further storing an identifier of a chain of process steps executing on a single application server and a value that indicates the position of the first process step relative to other steps of the chain.

In Example 14, the subject matter of Examples 11-13 includes, wherein the operations further comprise: running the testing script.

In Example 15, the subject matter of Examples 11-14 includes, wherein: the first process step is an executable process function (XP-Function).

In Example 16, the subject matter of Examples 11-15 includes, wherein: the accessing of the first log file comprises accessing the first log file from a first server via a network; and the accessing of the second log file comprises accessing the second log file from a second server via the network.

In Example 17, the subject matter of Examples 11-16 includes, wherein: the database is a first database; and the operations further comprise: accessing, from a second database, third data that identifies a third process step, the third data showing a change to a second document; based on the third data, updating the first database to store a third relationship between the third process step and the process.

Example 18 is a non-transitory computer-readable medium that stores instructions that, when executed by one or more processors, cause the one or more processors to perform operations comprising: accessing, from a first log file, first data that identifies a first process step, the first data showing a first change to a document associated with a process comprising the first process step and a second process step; based on the first data, updating a database to store a first relationship between the first process step and the process; accessing, from a second log file, second data that identifies a second process step, the second data showing a second change to the document; based on the second data, updating the database to store a second relationship between the second process step and the process; and generating a testing script for the process based on the stored first relationship and the stored second relationship.

In Example 19, the subject matter of Example 18 includes, wherein the operations further comprise: causing a user interface to be presented on a display device, the user interface comprising an option to cause the testing script to be generated; and wherein the generating of the testing script is in response to a selection of the option.

In Example 20, the subject matter of Examples 18-19 includes, wherein: the updating of the database to store the first relationship between the first process step and the process comprises updating a row of the database, the row of the database further storing an identifier of a chain of process steps executing on a single application server and a value that indicates the position of the first process step relative to other steps of the chain.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 19:
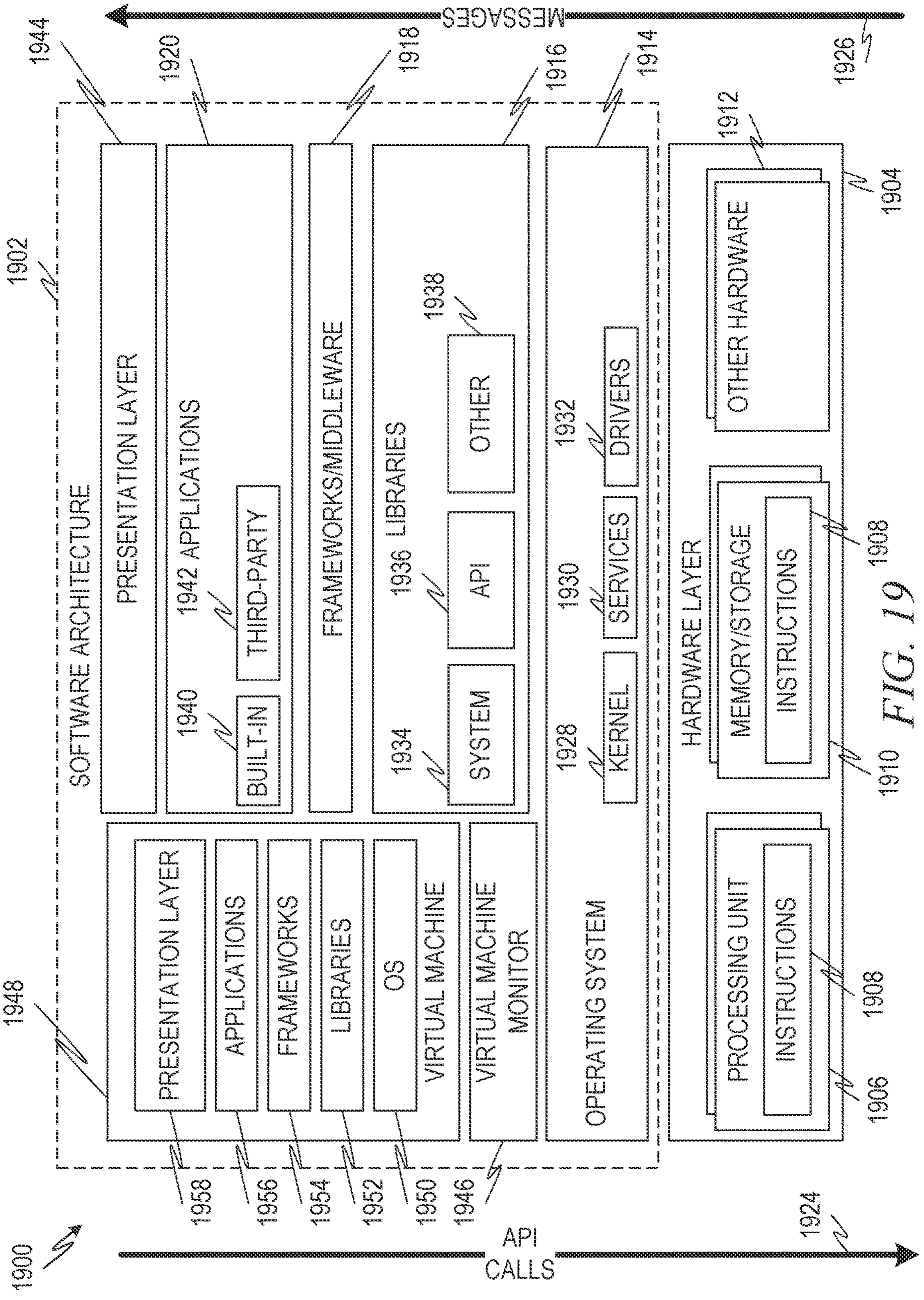
FIG. 19 is a block diagram showing one example of a software architecture for a computing device.

FIG. 19 is a block diagram 1900 showing one example of a software architecture 1902 for a computing device. The architecture 1902 may be used in conjunction with various hardware architectures, for example, as described herein. FIG. 19 is merely a non-limiting example of a software architecture and many other architectures may be implemented to facilitate the functionality described herein. A representative hardware layer 1904 is illustrated and can represent, for example, any of the above referenced computing devices. In some examples, the hardware layer 1904 may be implemented according to the architecture of the computer system of FIG. 19.

The representative hardware layer 1904 comprises one or more processing units 1906 having associated executable instructions 1908. Executable instructions 1908 represent the executable instructions of the software architecture 1902, including implementation of the methods, modules, subsystems, and components, and so forth described herein and may also include memory and/or storage modules 1910, which also have executable instructions 1908. Hardware layer 1904 may also comprise other hardware as indicated by other hardware 1912 which represents any other hardware of the hardware layer 1904, such as the other hardware illustrated as part of the software architecture 1902.

In the example architecture of FIG. 19, the software architecture 1902 may be conceptualized as a stack of layers where each layer provides particular functionality. For example, the software architecture 1902 may include layers such as an operating system 1914, libraries 1916, frameworks/middleware 1918, applications 1920, and presentation layer 1944. Operationally, the applications 1920 and/or other components within the layers may invoke application programming interface (API) calls 1924 through the software stack and access a response, returned values, and so forth illustrated as messages 1926 in response to the API calls 1924. The layers illustrated are representative in nature and not all software architectures have all layers. For example, some mobile or special purpose operating systems may not provide a frameworks/middleware layer 1918, while others may provide such a layer. Other software architectures may include additional or different layers.

The operating system 1914 may manage hardware resources and provide common services. The operating system 1914 may include, for example, a kernel 1928, services 1930, and drivers 1932. The kernel 1928 may act as an abstraction layer between the hardware and the other software layers. For example, the kernel 1928 may be responsible for memory management, processor management (e.g., scheduling), component management, networking, security settings, and so on. The services 1930 may provide other common services for the other software layers. In some examples, the services 1930 include an interrupt service. The interrupt service may detect the receipt of an interrupt and, in response, cause the architecture 1902 to pause its current processing and execute an interrupt service routine (ISR) when an interrupt is accessed.

The drivers 1932 may be responsible for controlling or interfacing with the underlying hardware. For instance, the drivers 1932 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1916 may provide a common infrastructure that may be utilized by the applications 1920 and/or other components and/or layers. The libraries 1916 typically provide functionality that allows other software modules to perform tasks in an easier fashion than to interface directly with the underlying operating system 1914 functionality (e.g., kernel 1928, services 1930 and/or drivers 1932). The libraries 1916 may include system libraries 1934 (e.g., C standard library) that may provide functions such as memory allocation functions, string manipulation functions, mathematic functions, and the like. In addition, the libraries 1916 may include API libraries 1936 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1916 may also include a wide variety of other libraries 1938 to provide many other APIs to the applications 1920 and other software components/modules.

The frameworks/middleware 1918 may provide a higher-level common infrastructure that may be utilized by the applications 1920 and/or other software components/modules. For example, the frameworks/middleware 1918 may provide various graphic user interface (GUI) functions, high-level resource management, high-level location services, and so forth. The frameworks/middleware 1918 may provide a broad spectrum of other APIs that may be utilized by the applications 1920 and/or other software components/modules, some of which may be specific to a particular operating system or platform.

The applications 1920 include built-in applications 1940 and/or third-party applications 1942. Examples of representative built-in applications 1940 may include, but are not limited to, a contacts application, a browser application, a book reader application, a location application, a media application, a messaging application, and/or a game application. Third-party applications 1942 may include any of the built-in applications 1940 as well as a broad assortment of other applications. In a specific example, the third-party application 1942 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1942 may invoke the API calls 1924 provided by the mobile operating system such as operating system 1914 to facilitate functionality described herein.

The applications 1920 may utilize built-in operating system functions (e.g., kernel 1928, services 1930 and/or drivers 1932), libraries (e.g., system libraries 1934, API libraries 1936, and other libraries 1938), frameworks/middleware 1918 to create user interfaces to interact with users of the system. Alternatively, or additionally, in some systems, interactions with a user may occur through a presentation layer, such as presentation layer 1944. In these systems, the application/module "logic" can be separated from the aspects of the application/module that interact with a user.

Some software architectures utilize virtual machines. In the example of FIG. 19, this is illustrated by virtual machine 1948. A virtual machine creates a software environment where applications/modules can execute as if they were executing on a hardware computing device. A virtual machine is hosted by a host operating system (operating system 1914) and typically, although not always, has a virtual machine monitor 1946, which manages the operation of the virtual machine 1948 as well as the interface with the host operating system (i.e., operating system 1914). A software architecture executes within the virtual machine 1948 such as an operating system 1950, libraries 1952, frameworks/middleware 1954, applications 1956 and/or presentation layer 1958. These layers of software architecture executing within the virtual machine 1948 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 20:
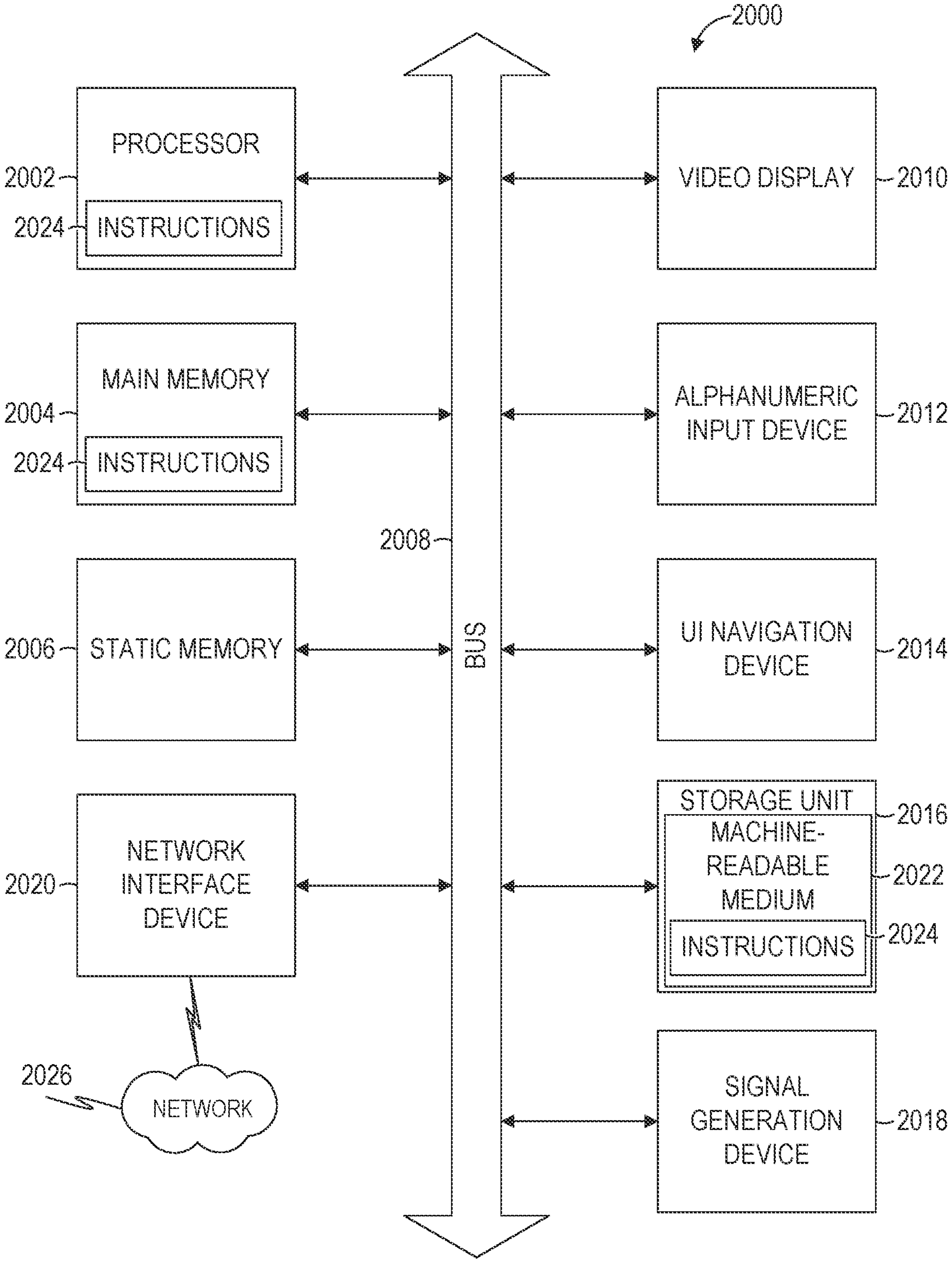
FIG. 20 is a block diagram of a machine in the example form of a computer system within which instructions may be executed for causing the machine to perform any one or more of the methodologies discussed herein.

FIG. 20 is a block diagram of a machine in the example form of a computer system 2000 within which instructions 2024 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2000 includes a processor 2002 (e.g., a central processing unit (CPU), a graphics processing unit (GPU), or both), a main memory 2004, and a static memory 2006, which communicate with each other via a bus 2008. The computer system 2000 may further include a video display unit 2010 (e.g., a liquid crystal display (LCD) or a cathode ray tube (CRT)). The computer system 2000 also includes an alphanumeric input device 2012 (e.g., a keyboard or a touch-sensitive display screen), a user interface (UI) navigation (or cursor control) device 2014 (e.g., a mouse), a storage unit 2016, a signal generation device 2018 (e.g., a speaker), and a network interface device 2020.

Machine-Readable Medium

The storage unit 2016 includes a machine-readable medium 2022 on which is stored one or more sets of data structures and instructions 2024 (e.g., software) embodying or utilized by any one or more of the methodologies or functions described herein. The instructions 2024 may also reside, completely or at least partially, within the main memory 2004 and/or within the processor 2002 during execution thereof by the computer system 2000, with the main memory 2004 and the processor 2002 also constituting machine-readable media 2022.

While the machine-readable medium 2022 is shown in an example embodiment to be a single medium, the term "machine-readable medium" may include a single medium or multiple media (e.g., a centralized or distributed database, and/or associated caches and servers) that store the one or more instructions 2024 or data structures. The term "machine-readable medium" shall also be taken to include any tangible medium that is capable of storing, encoding, or carrying instructions 2024 for execution by the machine and that cause the machine to perform any one or more of the methodologies of the present disclosure, or that is capable of storing, encoding, or carrying data structures utilized by or associated with such instructions 2024. The term "machine-readable medium" shall accordingly be taken to include, but not be limited to, solid-state memories, and optical and magnetic media. Specific examples of machine-readable media 2022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks: and compact disc read-only memory (CD-ROM) and digital versatile disc read-only memory (DVD-ROM) disks. A machine-readable medium is not a transmission medium.

Transmission Medium

The instructions 2024 may further be transmitted or received over a communications network 2026 using a transmission medium. The instructions 2024 may be transmitted using the network interface device 2020 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term “transmission medium” shall be taken to include any intangible medium that is capable of storing, encoding, or carrying instructions 2024 for execution by the machine, and includes digital or analog communications signals or other intangible media to facilitate communication of such software.

Although specific example embodiments are described herein, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term “invention” merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an “algorithm” is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as “data,” “content,” “bits,” “values,” “elements,” “symbols,” “characters,” “terms,” “numbers,” “numerals,” or the like. These words, however, are merely convenient labels and are to be associated with appropriate physical quantities.

Unless specifically stated otherwise, discussions herein using words such as “processing,” “computing,” “calculating,” “determining,” “presenting,” “displaying,” or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms “a” and “an” are herein used, as is common in patent documents, to include one or more than one instance. Finally, as used herein, the conjunction “or” refers to a non-exclusive “or,” unless specifically stated otherwise.

What is claimed is:

1. A method comprising:

accessing, by one or more processors, from a first log file on a first server, first data that shows a first change to a document by a first executable process function (XP-Function);

based on the first data, updating a database to store a first relationship between the first XP-Function and the document by storing a first row comprising an object identifier that identifies the document and a first index that identifies the first XP-Function;

accessing, by the one or more processors, from the first log file on the first server, second data that shows a second change to the document by a second XP-Function;

based on the second data, updating the database to store a second relationship between the second XP-Function and the document by storing a second row comprising the object identifier that identifies the document and a second index that identifies the second XP-Function;

based on the first XP-Function and the second XP-Function both executing on the first server, identifying a first executable process chain (XP-Chain) comprising the first XP-Function and the second XP-Function;

updating the database to store data relating the first XP-Function and the second XP-Function with the first XP-Chain;

accessing, from a second log file on a second server, third data that shows a third change to the document by a third XP-Function;

accessing, from the second log file on the second server, fourth data that shows a fourth change to the document by a fourth XP-Function;

based on the third XP-Function and the fourth XP-Function both executing on the second server, identifying a second XP-Chain comprising the third XP-Function and the fourth XP-Function;

updating the database to store data relating the third XP-Function and the fourth XP-Function with the second XP-Chain;

based on the first XP-Chain and the second XP-Chain both operating on the document, determining that the first XP-Chain and the second XP-Chain are part of an end-to-end process;

updating the database to store data relating the first XP-Chain and the second XP-Chain with the end-to-end process; and generating a testing script for the end-to-end process based on the stored data in the database.

2. The method of claim 1, further comprising:

causing a user interface to be presented on a display device, the user interface comprising an option to cause the testing script to be generated; and wherein the generating of the testing script is in response to a selection of the option.

3. The method of claim 1, wherein:

the updating of the database to store the data relating the first XP-Function and the second XP-Function with the first XP-Chain comprises storing a sequence value for the first XP-Function and the second XP-Function indicates a relative position of the first XP-Function and the second XP-Function.

4. The method of claim 1, further comprising:

running the testing script.

5. The method of claim 1, wherein:

the accessing of the first log file comprises accessing the first log file from the first server via a network; and the accessing of the second log file comprises accessing the second log file from the second server via the network.

6. The method of claim 1, wherein:

the database is a first database; and further comprising:

accessing, from a second database, fifth data that identifies a fifth XP-Function, the fifth data showing a change to the document; and based on the fifth data, updating the first database to store data relating the fifth XP-Function to the end-to-end process.

7. The method of claim 1, wherein the first XP-Function comprises a user interaction.

8. The method of claim 1, wherein the first XP-Function comprises an automated interaction.

9. The method of claim 1, wherein the first data further identifies a role associated with the first XP-Function.

10. A system comprising:

a memory that stores instructions; and one or more processors configured by the instructions to perform operations comprising:

accessing, from a first log file on a first server, first data that shows a first change to a document by a first executable process function (XP-Function);

based on the first data, updating a database to store a first relationship between the first XP-Function and the document by storing a first row comprising an object identifier that identifies the document and a first index that identifies the first XP-Function;

accessing, from the first log file on the first server, second data that shows a second change to the document by a second XP-Function;

based on the second data, updating the database to store a second relationship between the second XP-Function and the document by storing a second row comprising the object identifier that identifies the document and a second index that identifies the second XP-Function;

based on the first XP-Function and the second XP-Function both executing on the first server, identifying a first executable process chain (XP-Chain) comprising the first XP-Function and the second XP-Function;

updating the database to store data relating the first XP-Function and the second XP-Function with the first XP-Chain;

accessing, from a second log file on a second server, third data that shows a third change to the document by a third XP-Function;

accessing, from the second log file on the second server, fourth data that shows a fourth change to the document by a fourth XP-Function;

based on the third XP-Function and the fourth XP-Function both executing on the second server, identifying a second XP-Chain comprising the third XP-Function and the fourth XP-Function;

updating the database to store data relating the third XP-Function and the fourth XP-Function with the second XP-Chain;

based on the first XP-Chain and the second XP-Chain both operating on the document, determining that the first XP-Chain and the second XP-Chain are part of an end-to-end process;

updating the database to store data relating the first XP-Chain and the second XP-Chain with the end-to-end process; and generating a testing script for the end-to-end process based on the stored data in the database.

11. The system of claim 10, wherein the operations further comprise:

causing a user interface to be presented on a display device, the user interface comprising an option to cause the testing script to be generated; and wherein the generating of the testing script is in response to a selection of the option.

12. The system of claim 10, wherein:

the updating of the database to store the data relating the first XP-Function and the second XP-Function with the first XP-Chain comprises storing a sequence value for the first XP-Function and the second XP-Function indicates a relative position of the first XP-Function and the second XP-Function.

13. The system of claim 10, wherein the operations further comprise:

running the testing script.

14. The system of claim 10, wherein:

the accessing of the first log file comprises accessing the first log file from the first server via a network; and the accessing of the second log file comprises accessing the second log file from the second server via the network.

15. The system of claim 10, wherein:

the database is a first database; and the operations further comprise:

accessing, from a second database, fifth data that identifies a fifth XP-Function, the fifth data showing a change to the document; and based on the fifth data, updating the first database to store data relating the fifth XP-Function to the end-to-end process.

16. A non-transitory computer-readable medium that stores instructions that, when executed by one or more processors, cause the one or more processors to perform operations comprising:

accessing, from a first log file on a first server, first data that shows a first change to a document by a first executable process function (XP-Function);

based on the first data, updating a database to store a first relationship between the first XP-Function and the document by storing a first row comprising an object identifier that identifies the document and a first index that identifies the first XP-Function;

accessing, from the first log file on the first server, second data that shows a second change to the document by a second XP-Function;

based on the second data, updating the database to store a second relationship between the second XP-Function and the document by storing a second row comprising the object identifier that identifies the document and a second index that identifies the second XP-Function;

based on the first XP-Function and the second XP-Function both executing on the first server, identifying a first executable process chain (XP-Chain) comprising the first XP-Function and the second XP-Function;

updating the database to store data relating the first XP-Function and the second XP-Function with the first XP-Chain;

accessing, from a second log file on a second server, third data that shows a third change to the document by a third XP-Function;

accessing, from the second log file on the second server, fourth data that shows a fourth change to the document by a fourth XP-Function;

based on the third XP-Function and the fourth XP-Function both executing on the second server, identifying a second XP-Chain comprising the third XP-Function and the fourth XP-Function;

updating the database to store data relating the third XP-Function and the fourth XP-Function with the second XP-Chain;

based on the first XP-Chain and the second XP-Chain both operating on the document, determining that the first XP-Chain and the second XP-Chain are part of an end-to-end process;

updating the database to store data relating the first XP-Chain and the second XP-Chain with the end-to-end process; and generating a testing script for the end-to-end process based on the stored data in the database.

17. The non-transitory computer-readable medium of claim 16, wherein the operations further comprise:

causing a user interface to be presented on a display device, the user interface comprising an option to cause the testing script to be generated; and wherein the generating of the testing script is in response to a selection of the option.

18. The non-transitory computer-readable medium of claim 16, wherein:

the updating of the database to store the data relating the first XP-Function and the second XP-Function with the first XP-Chain comprises storing a sequence value for the first XP-Function and the second XP-Function indicates a relative position of the first XP-Function and the second XP-Function.

19. The non-transitory computer-readable medium of claim 16, wherein:

the accessing of the first log file comprises accessing the first log file from the first server via a network; and the accessing of the second log file comprises accessing the second log file from the second server via the network.

20. The non-transitory computer-readable medium of claim 16, wherein:

the database is a first database; and the operations further comprise:

accessing, from a second database, fifth data that identifies a fifth XP-Function, the fifth data showing a change to the document; and based on the fifth data, updating the first database to store data relating the fifth XP-Function to the end-to-end process.

* * * * *